US011683322B2

(12) United States Patent
McBride et al.

(10) Patent No.: US 11,683,322 B2
(45) Date of Patent: *Jun. 20, 2023

(54) TELEMETRY HUB

(71) Applicant: CenturyLink Intellectual Property LLC, Broomfield, CO (US)

(72) Inventors: Kevin M. McBride, Lone Tree, CO (US); Steven M. Casey, Littleton, CO (US); Stephen Opferman, Denver, CO (US); Hunter Rudd, Broomfield, CO (US); James E. Sutherland, Town and Country, MO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,887

(22) Filed: Apr. 27, 2022

(65) Prior Publication Data

US 2022/0255948 A1 Aug. 11, 2022

Related U.S. Application Data

(63) Continuation of application No. 16/866,703, filed on May 5, 2020, now Pat. No. 11,323,456.

(60) Provisional application No. 62/957,652, filed on Jan. 6, 2020.

(51) Int. Cl.
*H04L 9/40* (2022.01)
*G06F 16/27* (2019.01)
*G06F 21/64* (2013.01)
*H04L 67/12* (2022.01)

(52) U.S. Cl.
CPC .............. *H04L 63/12* (2013.01); *G06F 16/27* (2019.01); *G06F 21/64* (2013.01); *H04L 67/12* (2013.01)

(58) Field of Classification Search
CPC ....... H04L 63/12; H04L 67/12; H04L 67/104; H04L 67/02; H04L 67/125; H04L 67/18; G06F 16/27; G06F 21/64; H04W 12/009; H04W 12/106; H04W 12/61; H04W 12/63
See application file for complete search history.

(56) References Cited

U.S. PATENT DOCUMENTS

| 10,255,445 B1* | 4/2019 | Brinskelle ............. G06F 21/606 |
| 11,186,111 B1* | 11/2021 | Nagelberg ....... G06K 19/06037 |
| 2007/0213888 A1* | 9/2007 | Shidai ................... H04J 3/0682 |
| | | 701/1 |
| 2012/0110174 A1* | 5/2012 | Wootton ............. H04L 63/1416 |
| | | 709/224 |

(Continued)

*Primary Examiner* — Mohammed Waliullah

(57) ABSTRACT

Novel tools and techniques are provided for implementing a telemetry hub, and, more particularly, to methods, systems, and apparatuses for implementing a telemetry hub that obtains sensor data from a plurality of sources and that determines one or more first actions to take in response to receiving the first sensor data. In operation, a telemetry hub might receive first sensor data from one or more sensors. The telemetry hub may determine whether the first sensor data can be trusted and whether the first sensor data is valid. Based on a determination that the first sensor data can be trusted and is valid, the telemetry hub might analyze the first sensor data to determine one or more first actions to take. The telemetry hub might then implement the one or more first actions based at least in part on the analysis of the first sensor data.

17 Claims, 10 Drawing Sheets

(56) References Cited

U.S. PATENT DOCUMENTS

| | | | |
|---|---|---|---|
| 2015/0210287 A1* | 7/2015 | Penilla | G06F 3/04842 |
| | | | 701/49 |
| 2017/0180421 A1* | 6/2017 | Shieh | H04L 63/10 |
| 2018/0040172 A1* | 2/2018 | Funk | H04W 24/08 |
| 2019/0158598 A1* | 5/2019 | Seenappa | H04L 67/61 |
| 2021/0211436 A1 | 7/2021 | McBride | |

* cited by examiner

TELEMETRY HUB

CROSS-REFERENCE TO RELATED APPLICATIONS

This application is a continuation of U.S. patent application Ser. No. 16/866,703, filed on May 5, 2020, to McBride et al., now issued as U.S. Pat. No. 11,323,456, which claims priority to provisional U.S. Patent Application No. 62/957,652, filed on Jan. 6, 2020, to McBride et al.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing a telemetry hub, and, more particularly, to methods, systems, and apparatuses for implementing a telemetry hub that obtains sensor data from a plurality of sources and that determines one or more first actions to take in response to receiving the first sensor data from the plurality of sources.

BACKGROUND

In conventional systems, information or data from devices or from logging or record systems might be received by data dissemination systems or data collection systems. Such information or data, however, may be susceptible to interception by nefarious parties and/or spoofing by such parties, thus resulting in information or data that is unreliable or untrustworthy, especially where such information or data may be relied upon for predicting equipment failure. Further, the information or data is not obtained from a plurality of sources and the information or data is not analyzed to determine one or more relationships between the data obtained from a plurality of sources.

Hence, there is a need for more robust and scalable solutions for implementing a telemetry hub, and, more particularly, to methods, systems, and apparatuses for implementing a telemetry hub that obtains sensor data from a plurality of sources and that determines one or more first actions to take in response to receiving the first sensor data from the plurality of sources.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
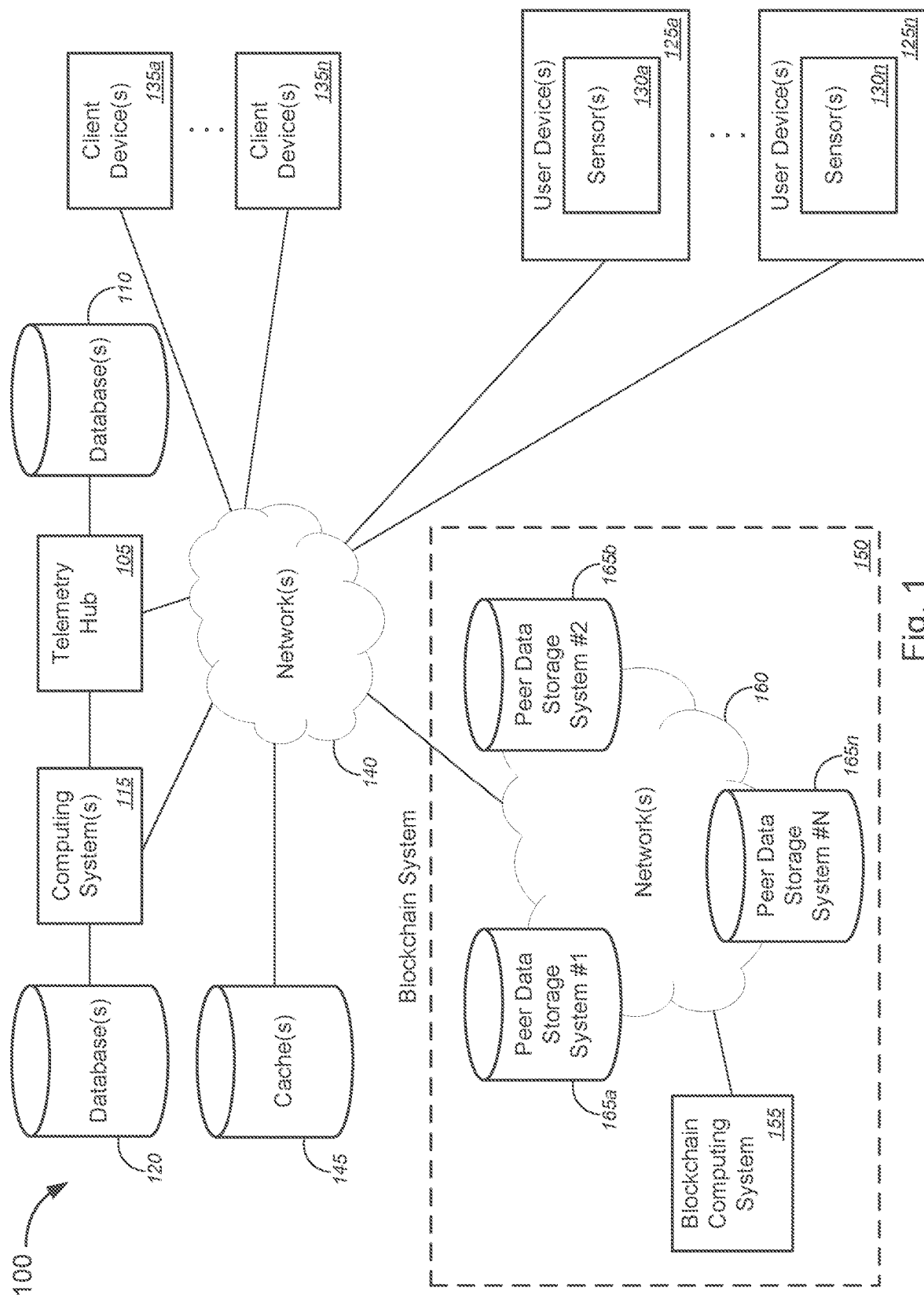
FIG. 1 is a schematic diagram illustrating a system for implementing a telemetry hub that obtains sensor data from a plurality of sources, in accordance with various embodiments.

Various embodiments provide tools and techniques for implementing a telemetry hub, and, more particularly, to methods, systems, and apparatuses for implementing a telemetry hub that obtains sensor data from a plurality of sources and that determines one or more first actions to take in response to receiving the first sensor data from the plurality of sources.

In various embodiments, a telemetry hub and/or computing system might receive first sensor data from one or more sensors associated with one or more first user devices. In some embodiments, the telemetry hub and/or the computing system may determine whether the first sensor data can be trusted. Based on a determination that the first sensor data can be trusted, the telemetry hub and/or the computing system may validate the first sensor data from the one or more sensors. In some embodiments, based on a determination that the first sensor data is valid, the telemetry hub and/or the computing system might also analyze the first sensor data to determine one or more first actions to take in response to receiving the first sensor data from the one or more user devices. Next, the telemetry hub and/or the computing system might implement the one or more first actions based at least in part on the analysis of the first sensor data.

The telemetry hub allows users to leverage one or more sensors contained within one or more user devices. The sensor data provided by the one or more sensors may then be used by one or more clients to develop applications and services for one or more customers. The telemetry hub may be used to provide a central location to obtain sensor data from one or more users within a particular geographic area and distribute this information to one or more clients and/or one or more customers.

The various embodiments described herein utilize the functionalities, advantages, and features of blockchain systems to make such information or data more secure and more transparently reliable due to the inherent validation capabilities of blockchain ledgers or the like, and the inherent capabilities of blockchain systems to clearly prevent covert replacement or modification of information contained in the blocks of the blockchain. The various embodiments might also utilize the blockchain system to perform data and/or source validation on data from equipment, where such data, once validated, might be used for performing equipment failure prediction.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, named data system technologies, data logging technologies, data request and retrieval technologies, data collection technologies, and/or the like. In other aspects, certain embodiments, can improve the functioning of user equipment or systems themselves (e.g., named data systems, data logging systems, data request and retrieval systems, data collection systems, etc.), for example, by receiving, with a telemetry hub, first sensor data from one or more sensors associated with one or more first user devices; determining, with a computing system, whether the first sensor data can be trusted; based on a determination that the first sensor data can be trusted, validating, with the computing system, the first sensor data from the one or more sensors; based on a determination that the first sensor data is valid, analyzing, with the computing system, the first sensor data to determine one or more first actions to take in response to receiving the first sensor data from the one or more user devices; and implementing, with the computing system, the one or more first actions based at least in part on the analysis of the first sensor data; and/or the like.

In particular, to the extent any abstract concepts are present in the various embodiments, those concepts can be implemented as described herein by devices, software, systems, and methods that involve specific novel functionality (e.g., steps or operations), such as, utilizing the functionalities, advantages, and features of the telemetry hub to make information or data that is output from one or more user devices more secure and more accessible to one or more client devices, and/or the like, to name a few examples, that extend beyond mere conventional computer processing operations. These functionalities can produce tangible results outside of the implementing computer system, including, merely by way of example, providing a more secure system for collection, logging, and transfer of data that is output from equipment, performing data and/or source validation on such data; resulting in information or data that is more reliable and more trustworthy, and/or the like, at least some results of which may be observed or measured by customers and/or service providers.

In an aspect, a method might comprise receiving, with a telemetry hub, first sensor data from one or more sensors associated with one or more first user devices; determining, with a computing system, whether the first sensor data can be trusted; based on a determination that the first sensor data can be trusted, validating, with the computing system, the first sensor data from the one or more sensors; based on a determination that the first sensor data is valid, analyzing, with the computing system, the first sensor data to determine one or more first actions to take in response to receiving the first sensor data from the one or more user devices; and implementing, with the computing system, the one or more first actions based at least in part on the analysis of the first sensor data.

In some embodiments, the telemetry hub might include the computing system. The computing system might comprise, without limitation, one of a data collection system, a real-time processing system, an artificial intelligence ("AI") system, a server computer, a cloud-based computing system over a network, or a distributed computing system, and/or the like. In some cases, the one or more first user devices might include one or more network nodes, one or more service provider devices, one or more laptop computers, one or more desktop computers, one or more tablet computers, one or more television sets, one or more smart televisions, one or more media players, one or more gaming consoles, one or more set-top boxes ("STBs"), one or more digital video recording ("DVR") devices, one or more smart phones, one or more mobile phones, or one or more personal digital assistants, and/or the like. According to some embodiments, the one or more sensors might comprise one or more accelerometers, one or more thermometers, one or more air flow sensors, one or more light sensors, one or more wind sensors, one or more weather station sensors, one or more wave sensors, one or more motion detectors, one or more humidity sensors, one or more smoke detectors, one or more gas detection sensors, one or more biometric sensors, one or more health sensors, one or more heartbeat sensors, one or more impact sensors, one or more cameras, or one or more location sensors, and/or the like.

Merely by way of example, in some cases, the method might further comprise based on a determination that the first sensor data requires further analysis to determine whether the first sensor data can be trusted, sending, with the computing system and to a blockchain system, a request for identifying a blockchain containing a block containing a copy of the first sensor data that is output by the one or more first user devices. In some instances, the method might further include analyzing, with at least one of the computing system or the blockchain system, the first sensor data by performing source identification on the first sensor data. The first sensor data might include source identification information and performing source validation on the first sensor data might include validating the source identification information contained in the first sensor data.

In some cases, analyzing, with the computing system, the first sensor data to determine one or more first actions to take in response to receiving the first sensor data from the one or more user devices might include analyzing, with the computing system, the first sensor data in real-time or near-real-time.

According to some embodiments, analyzing the first sensor data might further include determining, with the computing system, a geographic location associated with the first sensor data; and based on a determination of the geographic location associated with the first sensor data, determining one or more second actions to take in response to receiving the first sensor data from the geographic location.

The first sensor data might include, without limitation, at least one of data communicated by third party service provider systems, data communicated by public service systems, or public data, wherein the data communicated by public service systems comprises at least one of data communicated by transportation systems, data communicated by delivery systems, or data communicated by emergency response systems, and wherein the public data comprises at least one of data communicated by weather systems, data communicated by user devices, or data communicated by traffic systems, and/or the like.

In some embodiments, the first data might comprise at least one of one or more portions of a log of interactions between a user and a service provider, data communicated by third party service provider systems, data communicated by public service systems, or public data, and/or the like. The interactions between the user and the service provider might comprise at least one of online chats, text messages, telephone conversations, e-mail communications, software application usage, or service provider website interaction by the user, and/or the like. The public data might comprise at least one of weather data, stock data, news data, or street traffic data, and/or the like.

In various instances, the one of more first actions might include identifying, with the computing system, at least one user to receive the first sensor data; and sending, with the computing system, the first sensor data to one or more second user devices associated with the at least one user identified by the computing system.

Additionally and/or alternatively, the one or more first actions might include determining, with the computing device, whether the first sensor data from the at least one first user device is related to second sensor data from at least one second device; and based on a determination that the first sensor data from the at least one first user device is related to the second sensor data from the at least one second device, associating, with the computing system, the first sensor data from the at least one device with the second sensor data from the at least one second device. The first sensor data may be associated with the second sensor data based on a common geographic location associated with the first sensor data and the second sensor data. The method might further include generating, with the computing system, a profile with the first sensor data and the second sensor data; and displaying, with the computing system, the profile with the first sensor data and the second sensor data on a user device. The profile may display at least one of vehicle traffic in one or more geographic locations, pedestrian traffic in one or more geographic locations, one or more obstacles located in one or more geographic locations, natural disasters in one or more geographic locations, or one or more weather paths, and/or the like.

In some embodiments, the one or more first actions might include determining, with the computing system, a time sensitivity associated with the first sensor data; based on a determination that the first sensor data is time sensitive, determining, with the computing system, a first amount of time to store the first sensor data; and based on a determination that the first sensor data is not time sensitive, determining, with the computing system, a second amount of time to store the first sensor data.

In various cases, analyzing the first sensor data to determine one or more first actions to be taken in response to receiving the first sensor data from the at least one first user device might further comprise analyzing, with the computing system, the first sensor data to determine whether the first sensor data comprises jerk feedback associated with a particular geographic location; based on a determination that the first sensor data comprises jerk feedback associated with the particular geographic location, determining one or more second actions to be taken in response to receiving the jerk feedback from the at least one first user device; generating a notification indicating a geographic location where the jerk feedback occurred; and sending, with the computing device, the notification to one or more user devices located within the geographic location where the jerk feedback occurred.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive first sensor data from one or more sensors associated with one or more first user devices; determine whether the first sensor data can be trusted; based on a determination that the first sensor data can be trusted, validate the first sensor data from the one or more sensors; based on a determination that the first sensor data is valid, analyze the first sensor data to determine one or more first actions to take in response to receiving the first sensor data from the one or more user devices; and implement the one or more first actions based at least in part on the analysis of the first sensor data.

In yet another aspect, a system might comprise a first user device, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first user device to: receive sensor data from one or more sensors associated with the first user device; and send the sensor data to a telemetry hub.

The system might further comprise a telemetry hub, which might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the telemetry hub to: receive the first sensor data from the first user device; and send the first sensor data to a computing system.

The system might further comprise a computing system, which might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the computing system to: determine whether the first sensor data can be trusted; based on a determination that the first sensor data can be trusted, validate the first sensor data from the one or more sensors; based on a determination that the first sensor data is valid, analyze the first sensor data to determine one or more first actions to take in response to receiving the first sensor data from the one or more user devices; and implement the one or more first actions based at least in part on the analysis of the first sensor data.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing a telemetry hub, and, more particularly, to methods, systems, and apparatuses for implementing a telemetry hub that obtains sensor data from a plurality of sources and that determines one or more first actions to take in response to receiving the first sensor data from the plurality of sources, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing a telemetry hub 105 that obtains sensor data from a plurality of sources and that determines one or more first actions to take in response to receiving the first sensor data from the plurality of sources, in accordance with various embodiments.

In the non-limiting embodiment of FIG. 1, system 100 might comprise a telemetry hub 105 and corresponding database(s) 110. In some cases, system 100 might further comprise computing system(s) 115 and corresponding database(s) 120. The computing system(s) 115 might be separate from or integrated into telemetry hub 105. Additionally, database(s) 120 might be separate from or integrated into database(s) 110. In some embodiments, the telemetry hub 105 and/or computing system(s) 115 might include, without limitation, one of a data collection system, a real-time processing system, an artificial intelligence ("AI") system, a data dissemination system, a named data system, a server computer, a cloud-based computing system over a network, or a distributed computing system, and/or the like.

System 100 might further include one or more user devices 125a-125n (collectively, "user devices 125" or the like) comprising one or more sensors 130a-130n (collectively, "sensors 130" or the like). In some cases, the one or more user devices 125 might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. The one or more sensors 130 might include, without limitation, one or more accelerometers, one or more thermometers, one or more air flow sensors, one or more light sensors, one or more wind sensors, one or more weather station sensors, one or more wave sensors, one or more motion detectors, one or more humidity sensors, one or more smoke detectors, one or more gas detection sensors, one or more biometric sensors, one or more health sensors, one or more heartbeat sensors, one or more impact sensors, one or more cameras, or one or more location sensors, and/or the like.

System 100 might additionally include one or more client device(s) 135a-135n (collectively, "client devices 135"), one or more networks 140, one or more caches 145, and a blockchain system 150. In some cases, the one or more client devices 135 might each include, but is not limited to, one of a network node, a service provider device, a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. The network(s) 140 might communicatively couple together two or more of the telemetry hub 105, computing system(s) 115, the user device(s) 125, the one or more client devices 135, the cache(s) 145, and the blockchain system 150.

In some embodiments, the blockchain system 150 might comprise a blockchain computing system 155, one or more networks 160, and peer data storage systems #1 through #N 165a-165n (collectively, "peer data storage systems 165," "distributed peer data storage systems 165," or the like), the blockchain computing system 155 and the peer data storage systems 165 being communicatively coupled to each other via network(s) 160. Each instance of a blockchain containing a plurality of blocks might be stored in two or more of the plurality of peer data storage systems 165a-165n.

According to some embodiments, the network(s) 140 and/or 160 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol (e.g., LTE protocol, 5G protocol, LoRa protocol, etc.); and/or any combination of these and/or other networks. In a particular embodiment, the network(s) 140 and/or 160 might include an access network of the service provider (e.g., an Internet service provider ("ISP")). In another embodiment, the network(s) 140 and/or 160 might include a core network of the service provider, and/or the Internet.

In operation, a telemetry hub 105 might receive a request to register one or more user devices 125. When the telemetry hub receives the request to register the one or more user devices 125, the telemetry hub 105 may determine or identify one or more sensors 130 that are integrated within the user devices 125. Based on a determination that the sensor data provided by the one or more sensors 130 can be used by one or more client devices 135, the telemetry hub 105 may register the one or more sensors 130 and/or the one or more user devices 125. A user may register one or more sensors 130 and/or one or more user devices 125 for a period of time (e.g., at least one hour, at least one day, at least one week, at least one month, at least one year, and/or the like). Additionally and/or alternatively, a user may register one or more sensors 130 and/or one or more user devices 125 indefinitely and the one or more sensors 130 and/or the one or more user devices 125 may stay registered with the telemetry hub 105 until the user opts out of providing sensor data.

Once a first user device 125a is registered with the telemetry hub 105, the telemetry hub 105 might receive first sensor data from one or more sensors 130a associated with the first user device 125a. The sensor data may be sent periodically (e.g., every few seconds, every few minutes, hourly, daily, weekly, or monthly, etc.) by the first user device 125a to the telemetry hub 105. In some cases, the sensor data may be sent in response to a detection of an event by the first user device 125a. In a non-limiting example, the first user device 125a might detect one or more of an alarm sounding, temperature suddenly rising, or a sudden force, etc., and might send the first sensor data in response to one or more of these events.

Additionally and/or alternatively, the telemetry hub 105 and/or computing system(s) 115 might pull the sensor data from the user device 125a periodically (e.g., every few seconds, every few minutes, hourly, daily, weekly, or monthly, etc.). In a non-limiting example, based on a determination that an event (e.g., sports event, weather event, traffic event, festival, concert, etc.) is occurring in a geographic area, the telemetry hub 105 might periodically pull sensor data from one or more user devices 125 and/or one or more sensors 130 located in the geographic area. In some instances, the telemetry hub 105 and/or computing system(s) 115 might pull the sensor data from the user device 125a in response to a request from one or more client devices 135 for sensor data. The one or more client devices 135 might request sensor data within a specific geographic region and, in response to this request, the telemetry hub 105 and/or computing system(s) 115 might pull the sensor data from the one or more devices 125 and/or one or more sensors 130 within the geographic region. The telemetry hub 105 and/or computing system(s) 115 might store the first sensor data in database 110, database 120, and/or cache 145.

The first sensor data might include, without limitation, at least one of data communicated by third party service provider systems, data communicated by public service systems, or public data, and/or the like. The data communicated by public service systems might include at least one of data communicated by transportation systems, data communicated by delivery systems, or data communicated by emergency response systems, and/or the like. The public data might include, without limitation, at least one of data communicated by weather systems, data communicated by user devices, or data communicated by traffic systems, and/or the like.

Next, the telemetry hub 105 and/or computing system(s) 115 might determine whether the first sensor data can be trusted. The telemetry hub 105 and/or computing system(s) 115 might determine whether the sensor data originated from a trusted user device 125, and/or the like. In some cases, based on a determination that the first user device 125a typically or historically provides trusted data, the telemetry hub 105 and/or computing system(s) 115 might determine that the data can be trusted.

Additionally, and/or alternatively, the telemetry hub 105 and/or computing system(s) 115 might send the first sensor data to blockchain system 150 to determine whether the first sensor data can be trusted. The telemetry hub 105 and/or computing system(s) 115 might send, to the blockchain system 150 or blockchain computing system 155, a second request for identifying a blockchain (e.g., blockchain 205 of FIG. 2, or the like) containing a block containing the first sensor data (i.e., data that is output by the first user device 125a, or the like). In response to the blockchain system 150 or blockchain computing system 155 identifying a blockchain containing a block containing the first sensor data, the telemetry hub 105, the computing system(s) 115, the blockchain system 150, or blockchain computing system 155 might receive a copy of the identified blockchain from the blockchain system 150 or blockchain computing system 155. The telemetry hub 105 and/or computing system(s) 115 might then compare the first sensor data with the copy of the identified blockchain to make sure that the first sensor data matches the copy of the identified blockchain. Based on a determination that the first sensor data matches the copy of the identified blockchain, the telemetry hub 105 and/or the computing system(s) 115 might determine that the first sensor data can be trusted.

Based on a determination that the first sensor data can be trusted, the telemetry hub 105 and/or computing system(s) 115 might validate the first sensor data from the one or more sensors 130. The telemetry hub 105 and/or computing system(s) 115 might determine whether the first sensor data from the one or more sensors 130 is accurate. In order to validate the first sensor data, the telemetry hub 105 and/or computing system(s) 115 might compare the first sensor data with other sensor data within a geographic region and might determine whether the first sensor data matches or is close to the other sensor data within the same geographic region. Additionally and/or alternatively, based on a determination that the first user device 125a typically or historically provides accurate data, the telemetry hub 105 and/or computing system(s) 115 might determine that the first sensor data is accurate.

In some cases, based on a determination that the first sensor data is valid, the telemetry hub 105 and/or computing system(s) 115 might analyze the first sensor data to determine one or more first actions to take in response to receiving the first sensor data from the one or more user devices 125. The first sensor data might be analyzed in real-time or near real-time using real-time processing systems, artificial intelligence ("AI") systems, and/or the like. The first sensor data may be analyzed in real-time to determine whether the telemetry hub 105 and/or computing system(s) 115 needs to implement one or more actions in real-time.

In various embodiments, the telemetry hub 105 and/or computing system(s) 115 might remove private data from the first sensor data before sending the first sensor data to one or more client devices 135. For example, the telemetry hub 105 and/or computing system(s) 115 might remove the source of the first sensor data, a user associated with the first sensor device, a first user device 125a that sent the first sensor data, an exact location associated with the sensor data, or an exact time associated with the first sensor data, and/or the like.

In various instances, the first sensor data may be analyzed to determine a geographic location and/or a time associated with the first sensor data. The user device 125a may send the first sensor data with a location stamp indicating a location where the first sensor data was obtained and/or a time stamp indicating a time when the first sensor data was obtained. Based on a determination of the geographic location and/or time associated with the first sensor data, the telemetry hub 105 and/or computing system(s) 115 might determine one or more first actions to take in response to receiving the first sensor data from the geographic location and/or time.

The first sensor data might further be analyzed to determine a time-sensitivity associated with the first sensor data. For example, the telemetry hub 105 and/or computing system(s) 115 may determine whether to immediately implement the one or more first actions based on the first sensor data and/or determine whether to wait to implement the one or more first actions based on the first sensor data.

The telemetry hub 105 and/or computing system(s) 115 may further analyze the first sensor data to determine one or more trends (e.g., hourly trends, daily trends, weekly trends, monthly trends, yearly trends, seasonal trends, and/or the like). The telemetry hub 105 and/or computing system(s) 115 might determine whether sensor data should be included in a short-term trend or a long-term trend. In a non-limiting example, sensor data associated with "jerk feedback" (described in more detail later in the specification) may be kept for a shorter period of time and may be indicative of a shorter time period trend while weather data may be kept for longer to period of time and may be indicative of a seasonal trend. Based on the one or more determined trends, the telemetry hub 105 and/or computing system(s) 115 might determine one or more first actions to take.

The telemetry hub 105 and/or computing system(s) 115 might then implement the one or more first actions based at least in part on the analysis of the first sensor data. In some cases, the telemetry hub 105 and/or computing system(s) 115 might determine one or more users and/or client devices 135 to receive the first sensor data.

The one or more users and/or client devices 135 might be registered with the telemetry hub 105 and/or computing system(s) 115. A user may register one or more client devices 135 for a specific period of time (e.g., at least one hour, at least one day, at least one week, at least one month, at least one year, and/or the like). Additionally and/or alternatively, a user may register one or more client devices 135 indefinitely, and the one or more client devices 135 may stay registered with the telemetry hub 105 until the user opts out of providing sensor data.

Once one or more client devices 135 are registered with the telemetry hub 105, the telemetry hub 105 might receive first sensor data from one or more sensors 130*a* associated with the first user device 125*a* and might send the first sensor data to one or more client devices 135 based on a determination that the one or more client devices 135 are interested in the first sensor data. The sensor data may be sent periodically (e.g., every few seconds, every few minutes, hourly, daily, weekly, monthly, etc.) by the telemetry hub 105 and/or computing system(s) 115 to the one or more client devices 135. In some cases, the sensor data may be sent in response to a detection of an event by the telemetry hub 105 and/or computing system(s) 115. In a non-limiting example, the telemetry hub 105 and/or computing system(s) 115 might detect one or more of an alarm sounding, temperature suddenly rising, or a sudden force, etc., and might send the first sensor data to the one or more client devices 135 in response to one or more of these events.

In some embodiments, the one or more client devices 135 might request sensor data within a specific geographic region and, in response to this request, the telemetry hub 105 and/or computing system(s) 115 might send the sensor data from the one or more first user devices 125 within the geographic region to the requesting one or more client devices 135.

In some instances, the one or more first actions might include determining, with the telemetry hub 105 and/or the computing device 115, whether the first sensor data from the at least one first user device 125*a* is related to second sensor data from at least one second user device 125*b* (not shown). Based on a determination that the first sensor data from the first user device 125*a* is related to the second sensor data from the second user device 125*b*, the telemetry hub 105 and/or computing system(s) 115 might (1) remove redundant sensor data, (2) determine whether one or more patterns or trends exist between the first sensor data and the second sensor data; (3) validate the first sensor data with the second sensor data; and/or (4) associate the first sensor data with the second sensor data, and/or the like. The first sensor data may be associated with the second sensor data based on a common geographic location associated with the first sensor data and the second sensor data and/or a common time associated with the first sensor data and the second sensor data.

The telemetry hub 105 and/or computing system(s) 115 might generate a profile with the first sensor data and the second sensor data and might display the profile with the first sensor data and the second sensor data on one or more requesting client devices 135. The profile might display, without limitation, at least one of vehicle traffic in one or more geographic locations, pedestrian traffic in one or more geographic locations, one or more obstacles located in one or more geographic locations, natural disasters in one or more geographic locations, or one or more weather paths, and/or the like.

In some instances, the one or more actions might include determining, with the telemetry hub 105 and/or the computing system(s) 115, a time sensitivity associated with the first sensor data. Based on a determination that the first sensor data is time sensitive, the telemetry hub 105 and/or the computing system(s) 115 might determine a first amount of time to store the first sensor data. For example, if the first sensor data is time sensitive (e.g., real-time information such as traffic data, and/or the like), the first sensor data may only be stored for a short period of time because the first sensor data is only relevant for a short period of time. Based on a determination that the first sensor data is not time sensitive, the telemetry hub 105 and/or the computing system(s) 115 might determine a second amount of time to store the first sensor data. For example, if the first sensor data is not time sensitive (e.g., seasonal information such as weather data, and/or the like), the first sensor data may be stored for a longer period of time to determine seasonal information, yearly information, and/or the like. The first sensor data may be stored using blockchain system 150 to ensure that the first sensor data is trustworthy.

These and other functionalities of the various embodiments are described in detail below with respect to FIGS. 2-6.

Figure 2:
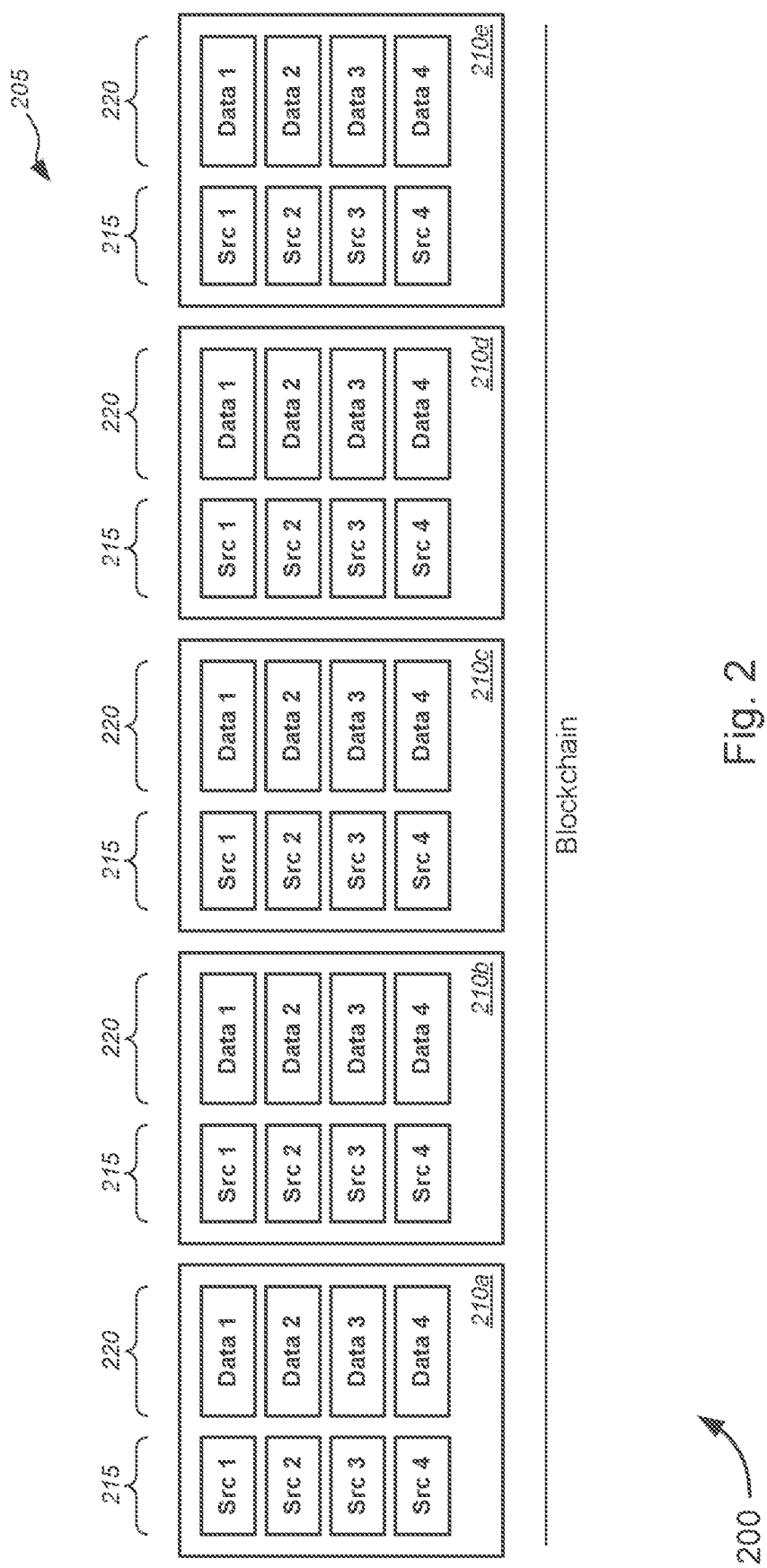
FIG. 2 is a schematic diagram illustrating an example of a blockchain that may be used by a system that utilizes blockchains to determine whether sensor data can be trusted, in accordance with various embodiments.

FIG. 2 is a schematic diagram illustrating an example 200 of a blockchain that may be used by a system that utilizes blockchains to determine whether sensor data can be trusted, in accordance with various embodiments.

With reference to FIG. 2, an example 200 of a blockchain 205 is depicted. Blockchain 205 might comprise a plurality of blocks 210*a*-210*e* (collectively, "blocks 210" or the like), each block 210 containing one or more source fields #1-#4 215 and/or one or more data fields #1-#4 220. The source fields 215 might each contain information regarding a source corresponding to data (e.g., source field #1 might correspond to data field #1, and so on). For purposes of simplicity of illustration, only five blocks 210 are shown in the blockchain 205 in FIG. 2, although blockchain 205 might comprise any suitable number of blocks 210. Although only four source fields 215 are shown in each block 210, the various embodiments are not so limited, and blockchains 205 might contain any suitable number of source fields 215. Similarly, although only four data fields 220 are shown in each block 210, the various embodiments are not so limited, and blockchains 205 might contain any suitable number of data fields 220. Although not shown, each block 210 might also contain other data or fields, including, but not limited to, block number fields, nonce field, location fields, data and/or time stamp fields, previous hash field, hash field, and/or the like. As described herein with respect to FIGS. 1 and 3-6, source identification may be performed on the data contained in the source fields 215, while data validation may be performed on the data contained in the data fields 220.

Figure 3:
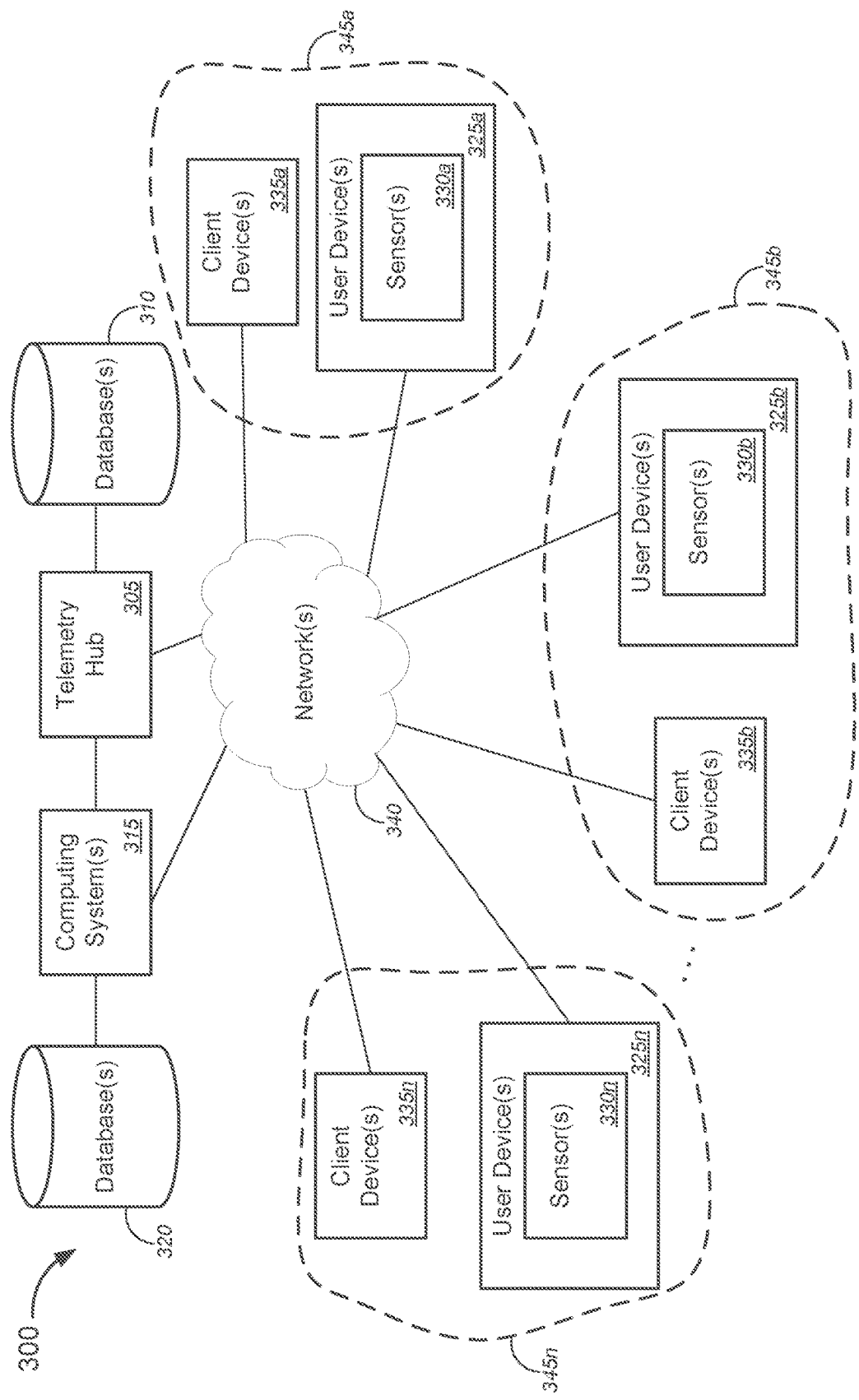
FIG. 3 is a schematic diagram illustrating another system for implementing a telemetry hub that obtains sensor data from a plurality of sources, in accordance with various embodiments.

FIG. 3 is a schematic diagram illustrating another system 300 for implementing a telemetry hub 305 that obtains sensor data from a plurality of sources, in accordance with various embodiments. System 300 represents a portion of system 100.

System 300 might comprise a telemetry hub 305 (which may correspond to telemetry hub 105 of FIG. 1, or the like) and a corresponding database(s) 310 (which may correspond to database(s) 110 of FIG. 1, or the like). System 300 might further include a computing system(s) 315 (which may correspond to computing system(s) 115 of FIG. 1, or the like) and a corresponding database(s) 320 (which may correspond to database(s) 120 of FIG. 1, or the like). System 300 might additionally include one or more user devices 325a-325n (which may correspond to one or more user devices 125a-125n of FIG. 1, or the like) and corresponding one or more sensors 330a-330n (which may correspond to one or more sensors 130a-130n of FIG. 1, or the like). System 300 might also include one or more client devices 335a-335n (which may correspond to one or more client devices 135a-135n of FIG. 1, or the like), one or more networks 340 (which may correspond to one or more networks 140 of FIG. 1, or the like), and one or more geographic regions 345a-345n. The one or more geographic regions 345a-345n may be different geographic regions.

In operation, a telemetry hub 305 and/or computing system(s) 315 might receive first sensor data from one or more sensors 330 associated with one or more first user devices 325. The first sensor data might have at least one of a geographic location and/or time stamp associated with the first sensor data. Additionally and/or alternatively, the telemetry hub 305 and/or computing system(s) 315 might pull the sensor data from the one or more first user devices 325a based on a determination that an event (e.g., sports event, weather event, traffic event, festival, concert, etc.) is occurring at a specific time and/or in a specific geographic region 345a. In some instances, the telemetry hub 305 and/or computing system(s) 315 might pull the sensor data from the one or more user devices 325a in response to a request from one or more client devices 335 for sensor data. The one or more client devices 335a might request sensor data within a specific geographic region 345a and, in response to this request, the telemetry hub 305 and/or computing system(s) 315 might pull the sensor data from the one or more user devices 325a within the geographic region 345a. The telemetry hub 305 and/or computing system(s) 315 might store the first sensor data in database(s) 310 and/or database(s) 320.

The telemetry hub 305 and/or computing system(s) 315 might validate the first sensor data from the one or more sensors 330. The telemetry hub 305 and/or computing system(s) 315 might determine whether the first sensor data from the one or more sensors 330 is accurate. In order to validate the first sensor data, the telemetry hub 305 and/or computing system(s) 315 might compare the first sensor data with other sensor data within a geographic region 345a and might determine whether the first sensor data matches or is close to the other sensor data within the same geographic region 345a.

In some cases, based on a determination that the first sensor data is valid, the telemetry hub 305 and/or computing system(s) 315 might analyze the first sensor data to determine one or more first actions to take in response to receiving the first sensor data from the one or more user devices 325. The first sensor data might be analyzed in real-time or near real-time using real-time processing systems, artificial intelligence ("AI") systems, and/or the like. The first sensor data may be analyzed in real-time to determine whether the telemetry hub 305 and/or computing system(s) 315 needs to implement one or more actions in real-time or near real-time.

In various instances, the first sensor data may be analyzed to determine a geographic region 345a and/or a time associated with the first sensor data. The user device 325a may send the first sensor data with a location stamp indicating a location where the first sensor data was obtained and/or a time stamp indicating a time when the first sensor data was obtained. Based on a determination of the geographic location 345a and/or time associated with the first sensor data, the telemetry hub 305 and/or computing system(s) 315 might determine one or more first actions to take in response to receiving the first sensor data from the geographic location and/or time.

The telemetry hub 305 and/or computing system(s) 315 might then implement the one or more first actions based at least in part on the analysis of the first sensor data. In some cases, the telemetry hub 305 and/or computing system(s) 315 might determine one or more users and/or client devices 335 to receive the first sensor data.

Once one or more client devices 335 are registered with the telemetry hub 305, the telemetry hub 305 may receive first sensor data from one or more sensors 330a associated with the first user device 325a and may send the first sensor data to one or more client devices 335a based on a determination that the one or more client devices 335a are interested in the first sensor data. The sensor data may be sent periodically (e.g., every few seconds, every few minutes, hourly, daily, weekly, monthly, etc.) by the telemetry hub 305 and/or computing system(s) 315 to the one or more client devices 335a. In some cases, the sensor data may be sent in response to a detection of an event by the telemetry hub 305 and/or computing system(s) 315 within geographic region 345a. In a non-limiting example, the telemetry hub 305 and/or computing system(s) 315 might detect one or more of an alarm sounding, temperature suddenly rising, or a sudden force, etc., and might send the first sensor data to the one or more client devices 335a in response to one or more of these events.

In some embodiments, the one or more client devices 335 might request sensor data within a specific geographic region 345a and, in response to this request, the telemetry hub 305 and/or computing system(s) 315 might send the sensor data from the one or more first user devices 325a within the geographic region 345a to the one or more requesting client device 335a.

In some instances, the one or more first actions might include determining, with the telemetry hub 305 and/or the computing system(s) 315, whether the first sensor data from the at least one first user device 325a is related to second sensor data from at least one second user device 325b. Based on a determination that the first sensor data from the first user device 325a is related to the second sensor data from the second user device 325b, the telemetry hub 305 and/or computing system(s) 315 might (1) remove redundant sensor data, (2) determine whether one or more patterns or trends exist between the first sensor data and the second sensor data; (3) validate the first sensor data with the second sensor data; and/or (4) associate the first sensor data with the second sensor data, and/or the like. The first sensor data may be associated with the second sensor data based on a common geographic location associated with the first sensor data and the second sensor data and/or a common time associated with the first sensor data and the second sensor data.

The telemetry hub 305 and/or computing system(s) 315 might generate a profile with the first sensor data and the second sensor data and might display the profile with the first sensor data and the second sensor data on one or more requesting client devices 335. The profile might display, without limitation, at least one of vehicle traffic in one or more geographic locations, pedestrian traffic in one or more geographic locations, one or more obstacles located in one or more geographic locations, natural disasters in one or more geographic locations, or one or more weather paths, and/or the like.

In some instances, the one or more actions might include determining, with the telemetry hub 305 and/or the computing system(s) 315, a time sensitivity associated with the first sensor data. Based on a determination that the first sensor data is time sensitive, the telemetry hub 305 and/or the computing system(s) 315 might determine a first amount of time to store the first sensor data. For example, if the first sensor data is time sensitive (e.g., real-time information such as traffic data, jerk feedback data, and/or the like), the first sensor data may only be stored for a short period of time because the first sensor data is only relevant for a short period of time. Based on a determination that the first sensor data is not time sensitive, the telemetry hub 305 and/or the computing system(s) 315 might determine a second amount of time to store the first sensor data. For example, if the first sensor data is not time sensitive (e.g., seasonal information such as weather data, and/or the like), the first sensor data may be stored for a longer period of time to determine seasonal information, yearly information, and/or the like. The first sensor data may be stored using a blockchain system to ensure that the first sensor data is trustworthy.

Figure 4:
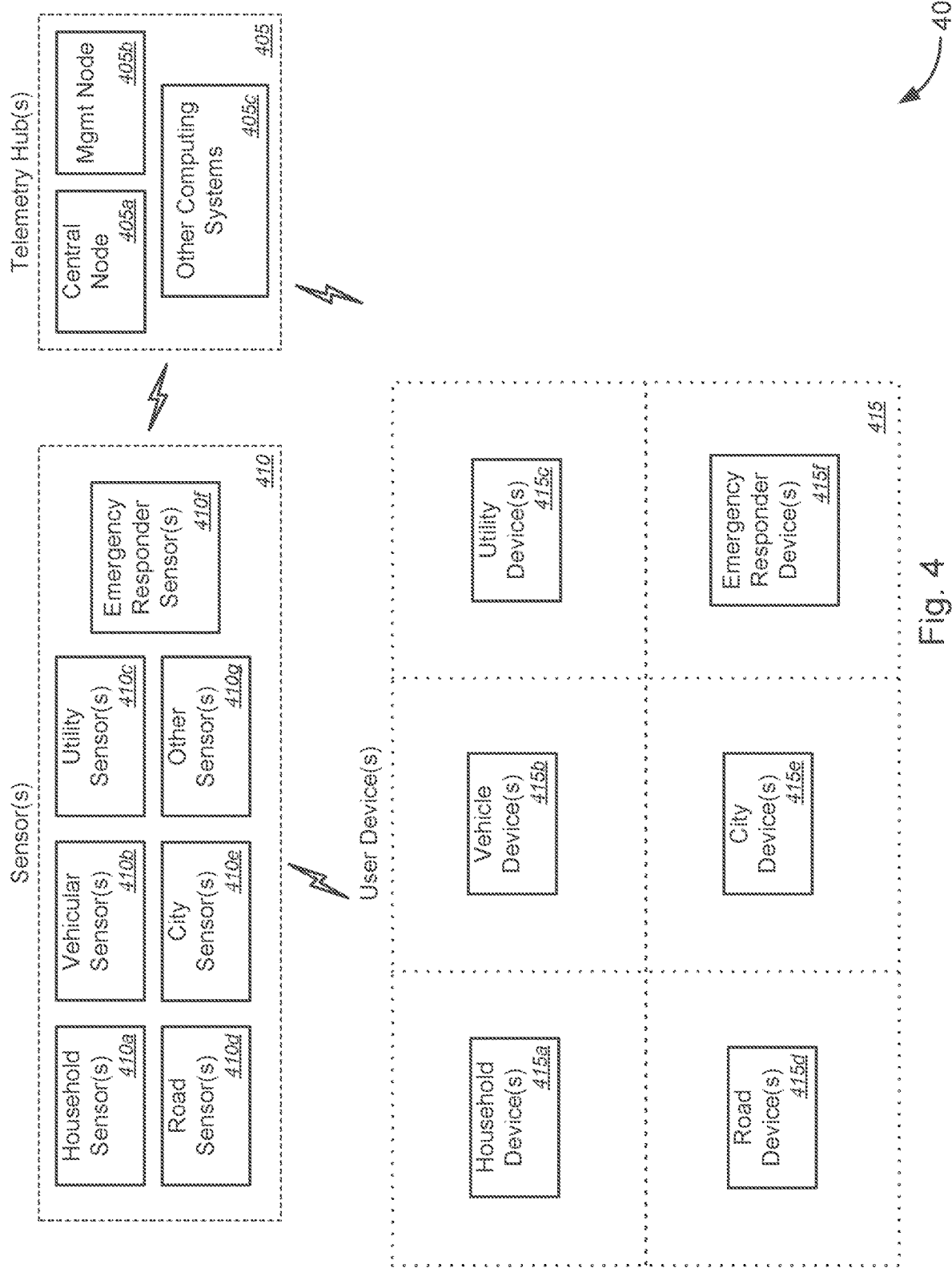
FIG. 4 is a schematic diagram illustrating an embodiment of yet another system for implementing a telemetry hub that obtains sensor data from a plurality of sources, in accordance with various embodiments.

FIG. 4 is a schematic diagram illustrating a system 400 for implementing a telemetry hub 405 that obtains sensor data from a plurality of sources and that determines one or more first actions to take in response to receiving the first sensor data from the plurality of sources, in accordance with various embodiments.

In FIG. 4, system 400 might comprise one or more telemetry hubs 405, one or more sensors 410, and/or one or more user devices 415, each of which might communicate with each other via machine-to-machine communications and/or via one or more networks.

The one or more telemetry hubs 405 might include, without limitation, at least one of a central node 405a (or a single processor or a plurality of processors disposed therein, where such processor or processors may be physical or virtual in nature) located within a service provider network, a management node 405b that may be located within at least a portion of a population area, a roadway, and/or the like, and/or other computing systems 405c, which might include, but are not limited to, a management node that may be located at a service provider facility associated with a service provider that provides services to at least portions of the population area, a management node located at a customer premises, one or more roadway-embedded management nodes, one or more municipal, state, federal, or private entity management nodes, a computing system disposed at a vehicle traffic control center, a server computer that serves the population area, a server computer that is remote from the population area, a cloud computing system, a distributed computing system that integrates computing resources from two or more devices, or a combination of two or more of these computing systems, and/or the like According to some embodiments, the one or more sensors 410 might include, without limitation, one or more household sensors 410a, one or more vehicular sensors 410b, one or more utility sensors 410c, one or more road sensor(s) 410d, one or more city sensor(s) 410e, one or more sensors associated with one or more emergency responders 410f, one or more other sensor(s) 410g, and/or the like.

The one or more household sensor(s) 410a might include at least one of one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more cameras, one or more biometric sensors, one or more health sensors (e.g., fitness tracker, heart rate sensor, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more gas detectors, one or more water leak detectors, one or more contact sensors, one or more audio sensors, one or more accelerometers, one or more proximity sensors, one or more radiation sensors, one or more telecommunications signal sensors, and/or the like. In some embodiments, the household sensors 410a might further include, without limitation, one or more thermometers in one or more rooms of the customer premises, one or more infrared ("IR") thermometers aimed at one or more positions in the one or more rooms, one or more air flow sensors in the one or more rooms, one or more air flow sensors in air ducts directed toward the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms or outside the customer premises, one or more humidity sensors in the one or more rooms, one or more smoke detectors detecting smoke in the one or more rooms, one or more gas detection sensors detecting gas in the one or more rooms, one or more biometric sensors identifying at least one person, or one or more health sensors detecting health information for at least one person, and/or the like.

The one or more vehicle sensors 410b might be associated with at least one of one or more vehicles associated with a customer premises, one or more vehicles associated with an emergency responder, one or more vehicles located on a roadway, and/or the like. The one or more vehicle sensors 410*b* might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, one or more stress sensors, or one or more suspension system diagnostic sensors, and/or the like.

The one or more utility sensors 410*c* may include, without limitation, one or more gas detection sensors, one or more water detection sensors, one or more gas flow rate sensors, one or more water flow rate sensors, and/or the like.

The one or more road sensor(s) 410*d* might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, one or more particulate sensors, one or more impact sensors, one or more stress sensors, or one or more location sensors, and/or the like.

The one or more city sensors 410*e* may include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more weather sensors, one or more motion sensors, one or more structural integrity sensors, one or more pressure sensors, one or more air quality sensors, one or more communications signal detectors, one or more seismic sensors, one or more weather station sensors, one or more moisture sensors, one or more humidity sensors, one or more wind sensors, one or more particulate sensors, one or more impact sensors, or one or more location sensors, and/or the like. In some instances, the one or more city sensors 410*e* might further comprise sensors in each of one or more vehicles travelling on the roadway. In some cases, the one or more structural integrity sensors might include, without limitation, at least one of two or more global positioning system sensors or two or more relative position sensors that are embedded in or disposed on one or more exterior surfaces of at least one of portions of one or more roadways (including, but not limited to, at least one of a local road, a main road, a highway, an airport apron, an airport ramp, an airport runway, a canal, a lock, or a waterway, and/or the like), portions of one or more public pathways (e.g., sidewalks, trails, public moving pathways, public escalators, public elevators, etc.), portions of one or more buildings (e.g., government buildings, other public buildings, etc.), portions of one or more public centers, portions of one or more airport terminal buildings, portions of one or more airport hangars and service buildings, portions of one or more railway facilities, portions of one or more railway tracks, portions of one or more marine ports, portions of one or more public transit structures, portions of one or more utility structures, portions of one or more public monuments or public art pieces, bridges, tunnels, and/or the like, where the sensor data from these sensors might comprise data indicating a change in position of one structural integrity sensor relative to another structural integrity sensor beyond a predetermined threshold amount, thereby indicating that there might be damage to corresponding at least one of one or more roadways, one or more public pathways, one or more buildings, one or more public centers, one or more airport terminal buildings, one or more airport hangars and service buildings, one or more railway facilities, one or more railway tracks, one or more marine ports, one or more public transit structures, one or more utility structures, one or more public monuments or public art pieces, bridges, tunnels, and/or the like.

The one or more emergency responder sensor(s) 410*f* may be associated with one or more emergency responders responding to an emergency situation. The one or more emergency responder sensor(s) 410*f*, may include, without limitation, one or more biometric sensors (e.g., fingerprint sensors, palm print sensors, footprint sensors, handprint sensors, voice identification sensors, iris scanners, retina scanners, etc.), one or more health sensors (e.g., heart rate monitors, respiratory monitors, etc.) one or more locations sensors (e.g., global positioning system ("GPS") devices, global navigation satellite system ("GNSS") devices, other location sensors, etc.), and/or the like.

In some embodiments, the household devices 415*a* might include one or more household sensors 410*a* and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like. The household devices 415a might further include, but are not limited to, one or more of a furnace, an air conditioner, one or more automated skylight opening or closing systems, one or more humidifiers, one or more dehumidifiers, one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more air purifiers, one or more air filters, one or more electrostatic particulate collecting tools, a washing machine, a clothes dryer, a fire suppression system, one or more emergency exit markers, one or more exit route markers, one or more lights (e.g., LEDs, indicator lights, warning lights, etc.), one or more fire suppression drones, one or more white noise generators, and/or the like.

The one or more vehicular devices 415b might be associated with at least one of one or more vehicles associated with a customer premises, one or more vehicles associated with an emergency responder, one or more vehicles located on a roadway between one or more emergency response vehicles and a customer premises, and/or the like. The one or more vehicular devices 415b might include, but are not limited to, one or more sensors 410b and/or might further include, without limitation, a vehicle computer, a vehicle engine, an electronic throttle control ("ETC") system, a vehicle brake system, a vehicle steering system, a vehicle head light system, a vehicle turn signal light system, a vehicle brake light system, a vehicle (analog or digital) instrument gauge cluster, a vehicle heads-up-display ("HUD") system, a vehicle-based transceiver or communications system, a navigation system, a vehicle display device, a vehicle speaker system, a vehicle (self-) diagnostic system, a vehicle hazard light system, a vehicle gear system, a door unlocking/locking system, an automated door opening/closing system, an automated window opening or closing system, an automated vehicle window covering control system, a data port, one or more vehicle climate control systems, one or more air purifiers, one or more air filters, one or more electrostatic particulate collecting tools, a fire suppression system, one or more lights (e.g., reading lights, LEDs, indicator lights, warning lights, etc.), or a vehicle-based wireless access point ("WAP"), and/or the like.

The one or more utility devices 415c, might include, but are not limited to, one or more sensors 410c and/or might further include, without limitation, one or more electric utility devices, one or more gas utility devices, or one or more water utility devices, and/or the like.

The one or more road device(s) 415d, might include, but are not limited to, one or more sensors 410d and/or might further include, without limitation, one or more power generation nodes, one or more battery charging nodes, one or more communications systems, one or more traffic control signal devices, one or more street lamps, one or more dynamic lane change markers, one or more vehicular components in each of one or more vehicles travelling on the roadway (including, but not limited to, a vehicle computer, a vehicle engine, an electronic throttle control ("ETC") system, a vehicle brake system, a vehicle steering system, a vehicle light system, a vehicle (analog or digital) instrument gauge cluster, a navigation system, a vehicle (self-) diagnostic system, a vehicle-based transceiver or communications system, and/or the like), a vehicle gear system, one or more air purifiers, one or more air filters, one or more electrostatic particulate collecting tools, a fire suppression system, one or more lights (e.g., LEDs, indicator lights, warning lights, etc.), or a wireless access point ("WAP"), and/or the like.

In some embodiments, the city devices 415e might include one or more city sensors 410e and/or might further include, without limitation, one or more power generation nodes, one or more battery charging nodes, one or more communications systems, one or more traffic control signal devices, one or more street lamps, one or more dynamic lane change markers, one or more vehicle systems or vehicular components in each of one or more vehicles travelling on the roadway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public transit vehicle systems in each of one or more public transit vehicles travelling on the roadway, waterway, and/or railway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public display devices (e.g., electronic billboards, digital public signs, public televisions, public monitors, public touchscreen interface displays, public directories, and/or the like), one or more power distribution systems, one or more railway systems (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices associated with users who are currently located in the population area, one or more cleaning systems, one or more grounds-keeping systems, one or more emergency (response) systems, one or more transceivers, a wireless access point ("WAP"), a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, a data port, one or more building climate control systems, one or more public transport climate control systems, one or more air purifiers, one or more air filters, one or more electrostatic particulate collecting tools, a fire suppression system, or one or more lights (e.g., reading lights, LEDs, indicator lights, warning lights, etc.), and/or the like.

In some cases, the emergency responder device(s), might include, without limitation, a desktop computer, a laptop computer, a tablet computer, a smart phone, a mobile phone, one or more personal digital assistants, one or more global positioning systems, or one or more drones, and/or the like.

Figure 5:
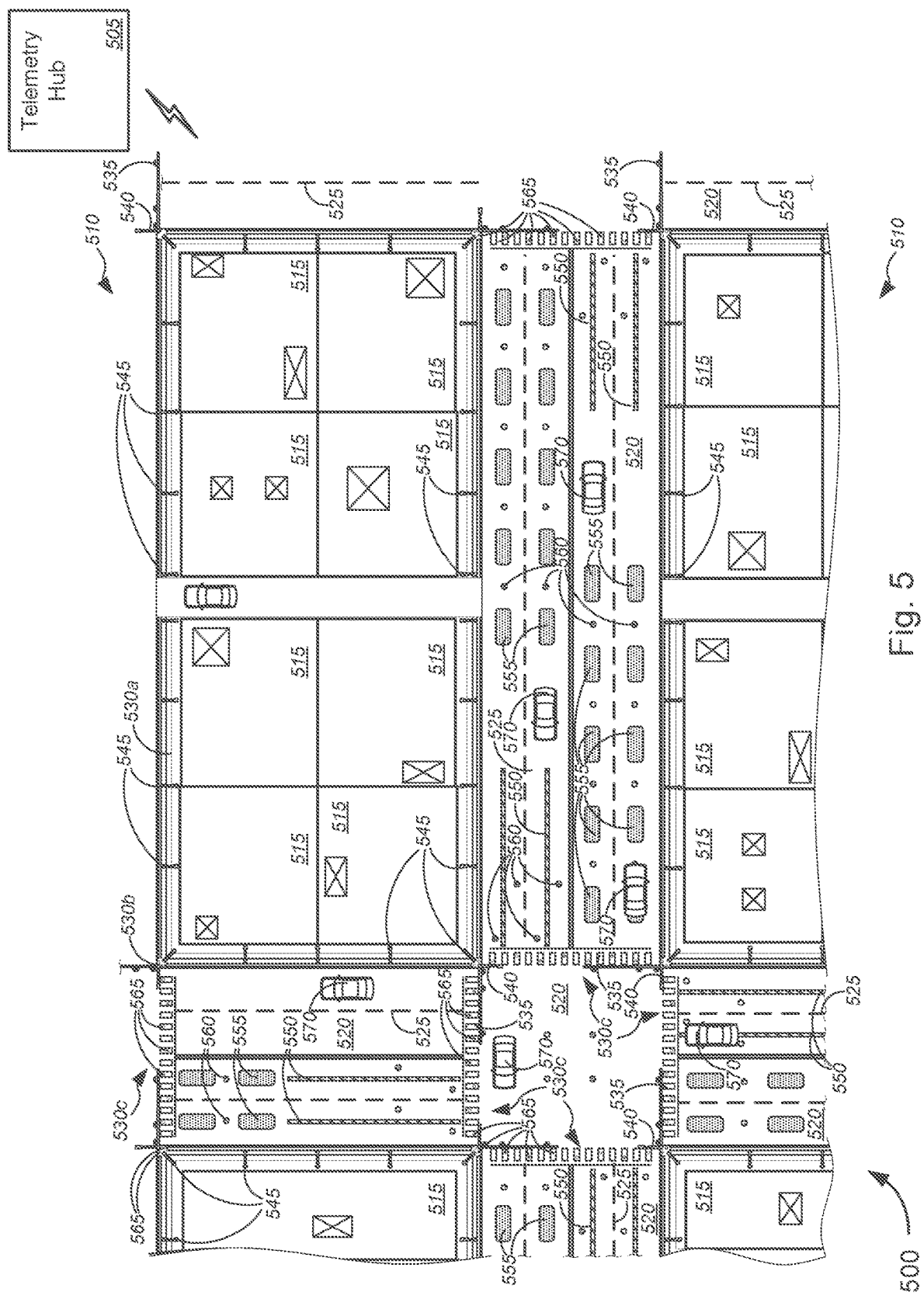
FIG. 5 is a schematic diagram illustrating another embodiment of still another system for implementing a telemetry hub that obtains sensor data from a plurality of sources, in accordance with various embodiments.

FIG. 5 is a schematic diagram illustrating a system 500 for implementing a telemetry hub 505 that obtains sensor data from a plurality of sources and that determines one or more first actions to take in response to receiving the first sensor data from the plurality of sources, in accordance with various embodiments.

With reference to FIG. 5, system 500 might comprise a city block 510. Although a city block 510 is shown if FIG. 5, other geographical man-made constructs might similarly apply, such constructs including, but not limited to, suburban sub-divisions, town centers, downtown districts, up-town districts, towns, villages, neighborhoods, and/or the like (collectively referred to herein as "city block" for simplicity of illustration). In some embodiments, a city block 510 might include, without limitation, one or more buildings or premises 515 which might comprise a home, building, business premises, commercial office, school, industrial building, etc.), one or more roadways 520 (which might include, without limitation, at least one of a local road, a main road, a highway, an airport apron, an airport ramp, an airport runway, a canal, a lock, or a waterway, and/or the like), one or more lane markers 525, one or more pathways 530, one or more traffic control signal devices 535, one or more roadway street lights 540, one or more sidewalk or pedestrian street lights 545, one or more roadway-embedded battery charging nodes or strips 550, one or more roadway-embedded power generation nodes 555, one or more roadway-embedded sensors 560, one or more pathway-embedded sensors 565, one or more vehicles 570 which might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like), and/or the like.

According to some embodiments, the one or more lane markers 525 might comprise one or more dynamic lane change markers. In some cases, the one or more roadway-embedded battery charging nodes or strips 550 and the one or more roadway-embedded power generation nodes 555 might respectively charge batteries in electric vehicles as the vehicles are travelling on the roadway 520 over the battery charging nodes (or while parked) and generate electrical power from solar energy, heat or friction energy from solar radiation or vehicle travel, and/or pressure transduction from vehicle passage, as described in detail below. The one or more roadway and/or pathway sensors 560 and 565, respectively, might each include, but is not limited to, at least one of one or more temperature sensors, one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, one or more particulate sensors, one or more impact sensors, one or more stress sensors, or one or more location sensors, and/or the like.

In some embodiments, a telemetry hub 505 might interact with each of at least one of one or more devices (e.g., the one or more lane markers 525, the one or more traffic control signal devices 535, the one or more roadway street lights 540, the one or more sidewalk or pedestrian street lights 545, the one or more roadway-embedded battery charging nodes or strips 550, the one or more roadway-embedded power generation nodes 555, the one or more vehicles 570, etc.) and/or sensors (the one or more roadway-embedded sensors 560, one or more pathway-embedded sensors 565, or other sensors (e.g., those that might be embodied within one or more of these devices or systems or embodied in stand-alone housings), etc.).

In some cases, the system as described herein may be used in adjunct integral areas, including, but not limited to, Interstate rest stops, a weigh station, a cattle guard, a state/national park entrance, a toll booth, median services (such as gas stations, restaurants, etc.), although these may be more prevalent on private toll ways or the like.

The following are examples of system 500 being used to in response to one or more situations. For example, in the case of one or more obstacles in a roadway 520 and/or a pathway 530, and/or the like, the telemetry hub 505 might receive at least first sensor data indicative of "jerk feedback." The telemetry hub 505 might analyze the first sensor data to determine whether it contains "jerk feedback." The sensor data that is indicative of "jerk feedback" might comprise, without limitation, accelerometer data indicating a sudden acceleration force from one or more cars or one or more user devices such as a smartphones, suspension data indicating a sudden suspension jerk of one or more cars, location data indicating that one or more users and/or one or more vehicles have altered their path, steering data indicating one or more drivers have steered their car in a different direction, lane change data indicating one or more cars are changing lanes at a particular location, and/or the like. All of the "jerk-feedback" data may be associated with location data to determine where the "jerk-feedback" was received.

The telemetry hub 505 might analyze the first sensor data to determine whether it contains "jerk feedback" and/or a pattern of "jerk feedback" in a certain geographic location. Based on a determination that the first sensor data comprises "jerk feedback" associated with the particular geographic location, the telemetry hub 505 might determine one or more first actions to be taken in response to receiving the jerk feedback from the at least one first user device. These one or more second actions might include, without limitation, determining whether the telemetry hub is receiving jerk feedback from more than one device in a particular location, generating a notification indicating a geographic location where the jerk feedback occurred, sending a notification indicating a geographic location where the jerk feedback occurred, displaying a map on one or more client devices indicating a geographic location where the jerk feedback occurred, causing one or more GPS systems to redirect vehicle traffic and/or pedestrian traffic around the one or more obstacles, and/or the like. The telemetry hub 505 might analyze the jerk feedback data in real-time to provide up to date data to one or more client devices requesting the jerk feedback data. In this way, one or more client devices requesting the jerk feedback data may steer one or more users around one or more obstacles in a particular geographic location.

Further, because the telemetry hub 505 is analyzing the jerk feedback data in real-time, the telemetry hub 505 might further determine whether the jerk feedback data has disappeared from a particular geographic location. Based on a determination that the jerk feedback has disappeared from the particular location, the telemetry hub 505 might determine that the one or more obstacles in a roadway 520 and/or a pathway 530, and/or the like have been removed.

Based on a determination that the first sensor data no longer comprises "jerk feedback" associated with the particular geographic location, the telemetry hub 505 might determine one or more first actions to be taken in response to determining the first sensor data no longer comprises the jerk feedback from the at least one first user device. These one or more second actions might include, without limitation, determining whether the telemetry hub is no longer receiving jerk feedback from more than one device in a particular location, generating a notification indicating a geographic location no longer has the jerk feedback and/or that the one or more obstacles have been removed, sending a notification indicating a geographic location where the one or more obstacles have been removed, displaying a map on one or more client devices indicating a geographic location where the one or more obstacles have been removed, causing one or more GPS systems to redirect vehicle traffic and/or pedestrian traffic back to the geographic location where the one or more obstacles have been removed, and/or the like.

In the event of a fire, the telemetry hub 505 might receive at least first sensor data indicative of a fire. The telemetry hub might analyze the first sensor data to determine whether it contains sensor data associated with a fire. The sensor data that is indicative of a fire might comprise, without limitation, temperature data indicating a sudden rise in temperature, dying gasp data indicating one or more devices are losing power, smoke data indicating one or more smoke alarms are detecting smoke, location data indicating locations of one or more devices, and/or the like.

In the event of a flood, the telemetry hub 505 might receive at least first sensor data indicative of a flood. The telemetry hub might analyze the first sensor data to determine whether it contains sensor data associated with a flood. The sensor data that is indicative of a flood might comprise, without limitation, temperature data indicating a sudden drop in temperature, dying gasp data indicating one or more devices are losing power, water data indicating one or more water sensors in one or more user devices are being exposed to water, location data indicating locations of one or more devices, and/or the like.

In the event of a tornado, the telemetry hub 505 might receive at least first sensor data indicative of a tornado. The telemetry hub might analyze the first sensor data to determine whether it contains sensor data associated with a tornado. The sensor data that is indicative of a tornado might comprise, without limitation, temperature data indicating a sudden drop or rise in temperature, dying gasp data indicating one or more devices are losing power, wind data indicating one or more wind sensors are detecting high winds, location data indicating locations of one or more devices, and/or the like.

In the event of a hurricane, the telemetry hub 505 might receive at least first sensor data indicative of a hurricane. The telemetry hub might analyze the first sensor data to determine whether it contains sensor data associated with a hurricane. The sensor data that is indicative of a hurricane might comprise, without limitation, temperature data indicating a sudden drop or rise in temperature, dying gasp data indicating one or more devices are losing power, wind data indicating one or more wind sensors are detecting high winds, location data indicating locations of one or more devices, and/or the like.

The telemetry hub 505 might analyze the first sensor data to determine whether it contains fire data, flood data, tornado data, hurricane data, weather data, natural disaster data, and/or the like in a certain geographic location. Based on a determination that the first sensor data comprises fire data, flood data, tornado data, hurricane data, weather data, natural disaster data, and/or the like associated with the particular geographic location, the telemetry hub 505 might determine one or more first actions to be taken in response to receiving the fire data, flood data, tornado data, hurricane data, weather data, natural disaster data and/or the like from the at least one first user device. These one or more first actions might include, without limitation, generating a notification indicating a geographic location where the fire, flood, tornado, weather, natural disaster, and/or the like is occurring, sending a notification indicating a geographic location where the fire, flood, tornado, weather, natural disaster, and/or the like is occurring, displaying a map on one or more client devices indicating a geographic location where the fire, flood, tornado, weather, natural disaster, and/or the like is occurring, displaying a path of the fire, flood, tornado, weather, natural disaster, and/or the like, causing one or more GPS systems to redirect vehicle traffic and/or pedestrian traffic around the fire, flood, tornado, weather, natural disaster, and/or the like, and/or the like. The telemetry hub 505 might analyze the fire data in real-time to provide up to date data to one or more client devices requesting the fire data, flood data, tornado data, weather data, natural disaster data, and/or the like.

In a non-limiting example, the telemetry hub 505 might use one or more dying gasp communications to track at least one of a fire event, a flood event, a tornado event, a hurricane event, a weather event, or a natural disaster event, and/or the like. For example, a user device might sense that it is losing power and send a dying gasp notification. Alternatively, one or one or more sensors of the user device might sense a sudden rise in temperature, smoke, exposure to water, and/or the like. Based on the sensor data, the user device might determine that it is about to lose power and send a dying gasp notification. These dying gasp notifications may be sent with location data of the user device.

The telemetry hub 505 might track the dying gasp notifications it receives from one or more user devices and determine one or more first actions to be taken in response to receiving the dying gasp notifications. These one or more first actions might include, without limitation, generating a notification indicating a geographic location where one or more dying gasp notifications are occurring, sending a notification indicating a geographic location where the one or more dying gasp notifications are occurring, displaying a map on one or more client devices indicating a geographic location where one or more dying gasp notifications are occurring, displaying a path of the one or more dying gasp notifications are, causing one or more GPS systems to redirect vehicle traffic and/or pedestrian traffic around where the one or more dying gasp notifications are, and/or the like. In a non-limiting example, as the one or more dying gasps occur in a particular area, the telemetry hub might be able to track the path of a fire, flood, tornado, hurricane, weather, natural disaster, and/or the like and send notifications to client devices indicating the path of the fire, flood, tornado, hurricane, weather, natural disaster, and/or the like.

The telemetry hub 505 might also be used to analyze vehicle traffic on road 520 and/or pedestrian traffic on pathway 530 over time. The telemetry hub 505 might receive at least first sensor data indicative of traffic. The telemetry hub 505 might analyze the first sensor data to determine whether it contains sensor data associated with traffic in a particular location. The sensor data that is indicative of a traffic might comprise, without limitation, camera data showing flow of traffic over time, camera data showing vehicles and/or pedestrians using one or more roadways and/or pathways, vehicle data indicating routes one or more vehicles take, pedestrian data indicating one or more routes pedestrians take, location data indicating locations of one or more devices, and/or the like.

The telemetry hub 505 might analyze the first sensor data to determine whether it contains traffic data in a certain geographic location. Based on a determination that the first sensor data comprises traffic data associated with the particular geographic location, the telemetry hub 505 might determine one or more first actions to be taken in response to receiving the traffic data from the at least one first user device. These one or more first actions might include, without limitation, generating a notification indicating a geographic location where the traffic is occurring, sending a notification indicating a geographic location where the traffic is occurring, displaying a map on one or more client devices indicating a geographic location where the traffic is occurring, determining whether another lane should be added to a road, determining whether a pathway should be widened, determining whether a bicycle lane should be added, determining a time of day when rush hour occurs, determining one or more alternate paths to avoid rush hour traffic, causing one or more GPS systems to redirect vehicle traffic and/or pedestrian traffic around traffic, and/or the like. The traffic data for a particular location may be analyzed overtime and may or may not require real-time analysis.

Although one or more obstacles, a fire, and traffic are being used as examples of sensor input, telemetry hub 505 might receive and/or send different sensor data based on different situations or events. These situations might include, without limitation, at least one of a fire, a car accident, a flood, a personal injury, a medical situation, a fire, a robbery, a burglary, an intruder, pedestrian traffic, vehicle traffic, weather, natural disasters, sports event, concert, festival, and/or the like.

Figure 6A:
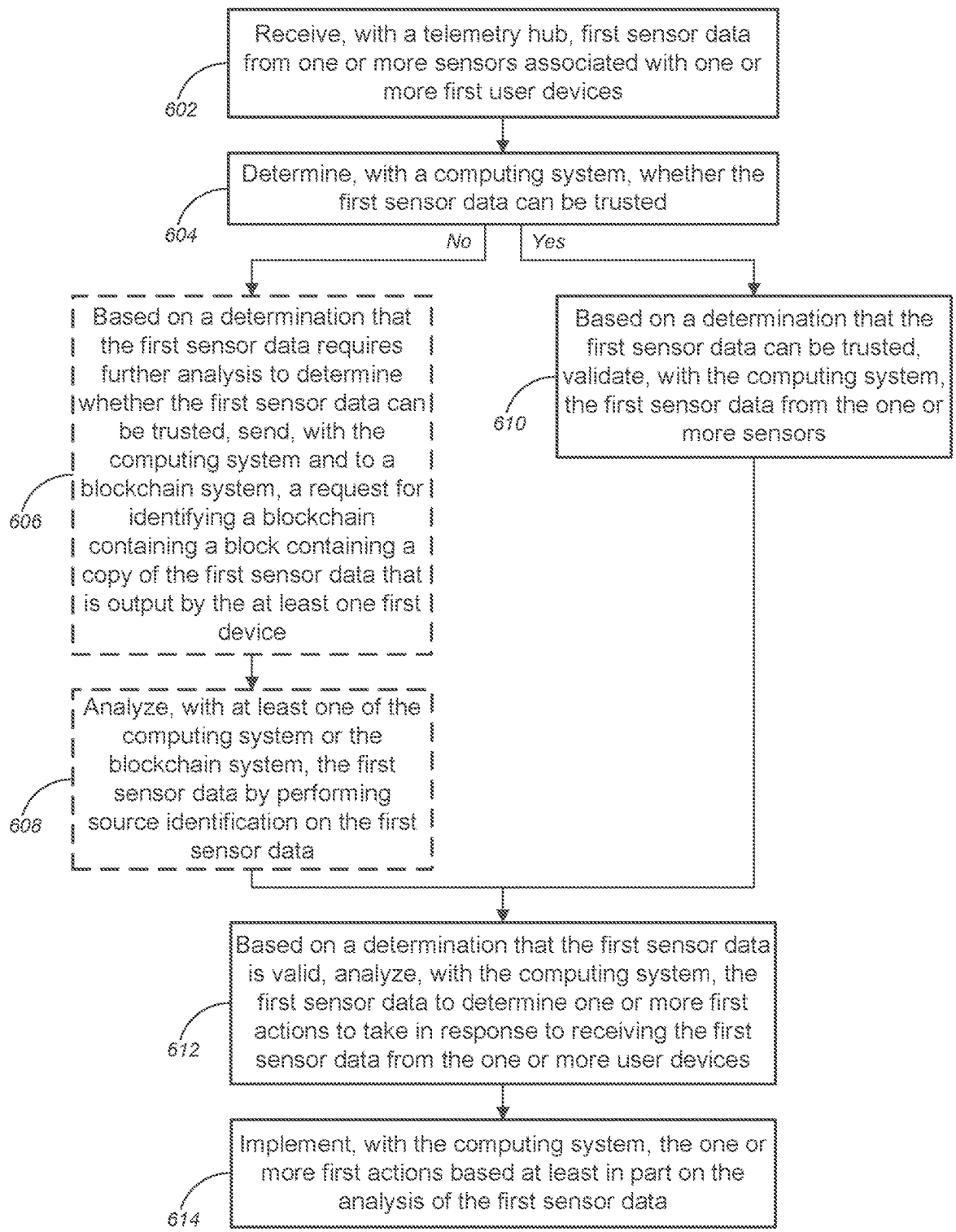
FIGS. 6A-6C are flow diagrams illustrating a method for implementing a telemetry hub that obtains sensor data from a plurality of sources, in accordance with various embodiments.
Figure 6B:
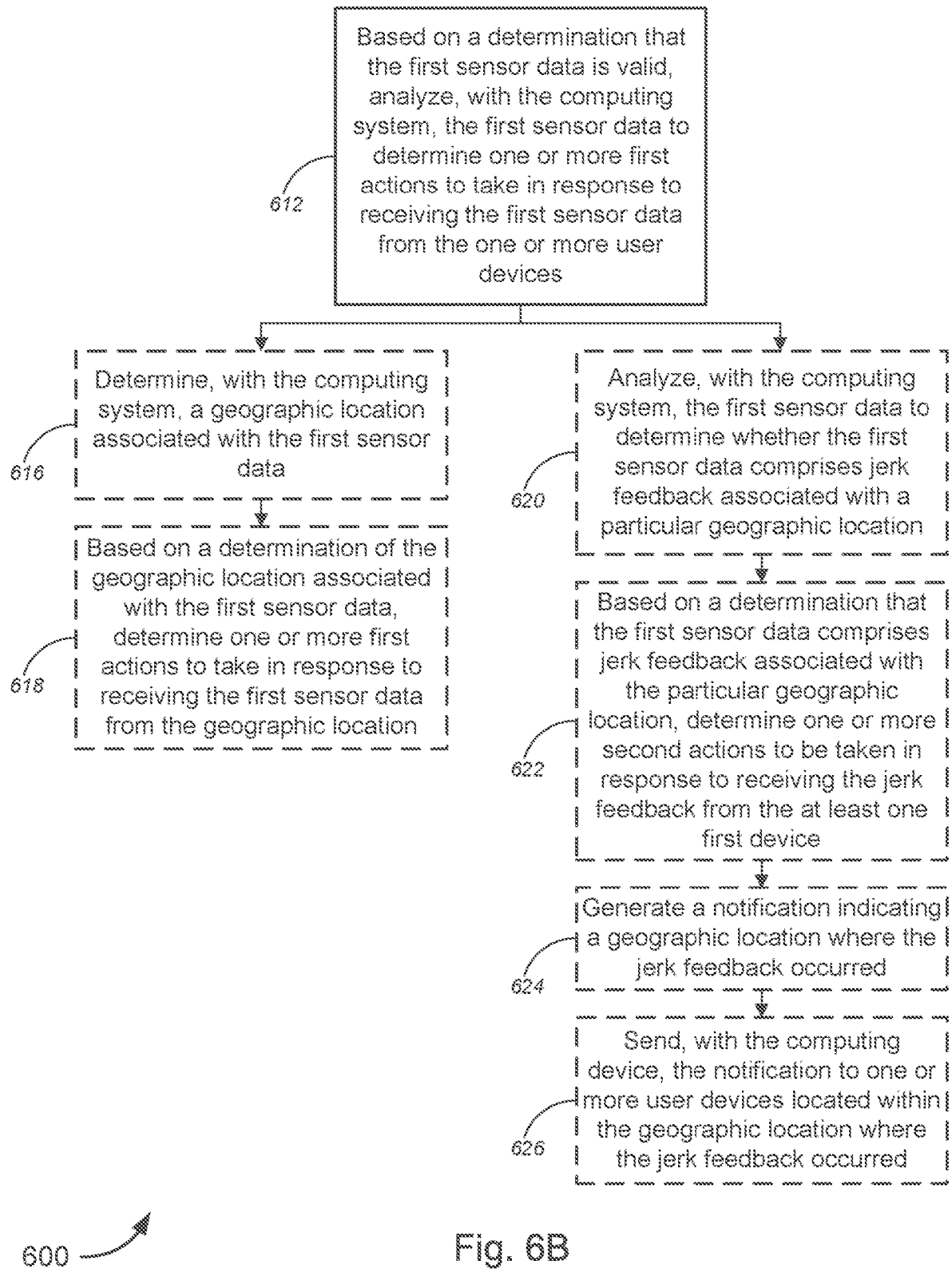
Figure 6C:
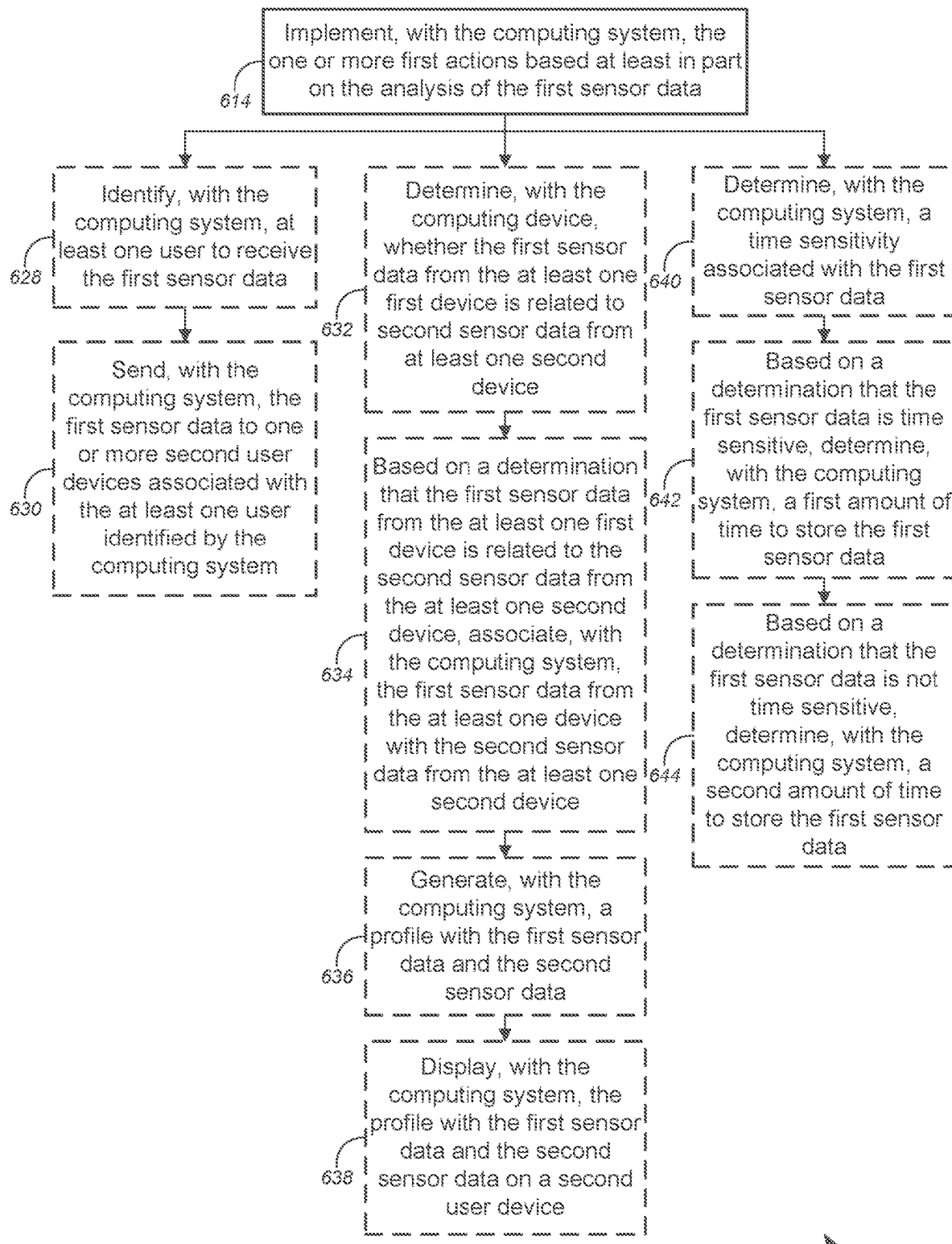

FIGS. 6A-6C (collectively, "FIG. 6") are flow diagrams illustrating a method 600 for implementing a telemetry hub that obtains sensor data from a plurality of sources, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, examples, or embodiments 100, 200, 300, 400, and 500 of FIGS. 1, 2, 3, 4, and 5, respectively (or components thereof), such methods may also be implemented using any suitable hardware (or software) implementation. Similarly, while each of the systems, examples, or embodiments 100, 200, 300, 400, and 500 of FIGS. 1, 2, 3, 4, and 5, respectively (or components thereof), can operate according to the method 600 illustrated by FIG. 6 (e.g., by executing instructions embodied on a computer readable medium), the systems, examples, or embodiments 100, 200, 300, 400, and 500 of FIGS. 1, 2, 3, 4, and 5 can each also operate according to other modes of operation and/or perform other suitable procedures.

In the non-limiting embodiment of FIG. 6A, method 600, at block 602, might comprise receiving, with a telemetry hub, first sensor data from one or more sensors associated with one or more first user devices. In some embodiments, the telemetry hub might receive a plurality of sensor data from a plurality of different first user devices. In some cases, the telemetry hub might include the computing system.

In some embodiments, the computing system might include, without limitation, one of a data collection system, a real-time processing system, an artificial intelligence ("AI") system, a data dissemination system, a named data system, a server computer, a cloud-based computing system over a network, or a distributed computing system, and/or the like. In some cases, the one or more first user devices, without limitation, includes one or more network nodes, one or more service provider devices, one or more laptop computers, one or more desktop computers, one or more tablet computers, one or more television sets, one or more smart televisions, one or more media players, one or more gaming consoles, one or more set-top boxes ("STBs"), one or more digital video recording ("DVR") devices, one or more smart phones, one or more mobile phones, or one or more personal digital assistants, and/or the like. The one or more sensors might include, but are not limited to, one or more accelerometers, one or more thermometers, one or more air flow sensors, one or more light sensors, one or more wind sensors, one or more weather station sensors, one or more wave sensors, one or more motion detectors, one or more humidity sensors, one or more smoke detectors, one or more gas detection sensors, one or more biometric sensors, one or more health sensors, one or more heartbeat sensors, one or more impact sensors, one or more cameras, or one or more location sensors, and/or the like.

At block 604, method 600 might comprise, determining, with a computing system, whether the first sensor data can be trusted. If not, method 600 might continue to the process at optional block 606. If so, the method 600 might proceed to the process at block 610. At optional block 606, method 600 might comprise, based on a determination that the first sensor data requires further analysis to determine whether the first sensor data can be trusted, sending, with the computing system and to a blockchain system, a request for identifying a blockchain containing a block containing a copy of the first sensor data that is output by the one or more first user devices. Next, method 600, at optional block 608 might continue by analyzing, with at least one of the computing system or the blockchain system, the first sensor data by performing source identification on the first sensor data. The first sensor data might include source identification information and performing source identification on the first sensor data might include determining the source identification information contained in the first sensor data and determining whether the source identification information contained in the first sensor data can be trusted.

At block 610, method 600 might comprise, based on a determination that the first sensor data can be trusted, validating, with the computing system, the first sensor data from the one or more sensors. The computing system might determine whether the first sensor data from the one or more sensors is accurate. In order to validate the first sensor data, the computing system might compare the first sensor data with other sensor data within a geographic region and might determine whether the first sensor data matches or is close to the other sensor data within the same geographic region. Additionally and/or alternatively, based on a determination that the one or more first user devices typically or historically provide accurate data, the computing system might determine that the first sensor data is accurate.

Method 600 might further comprise, based on a determination that the first sensor data is valid, analyzing, with the computing system, the first sensor data to determine one or more first actions to take in response to receiving the first sensor data from the one or more user devices (block 612). The first sensor data may be analyzed in real-time or near real-time. Analyzing the first sensor data might include different steps as shown in FIG. 6B. In some embodiments, method 600, at block 614, might comprise implementing, with the computing system, the one or more first actions based at least in part on the analysis of the first sensor data.

Implementing the one or more first actions might include different steps as shown in FIG. 6C.

In some embodiments, analyzing the first sensor data to determine one or more first actions to take in response to receiving the first sensor data from the one or more user devices (at block 612) might comprise determining, with the computing system, a geographic location associated with the first sensor data (optional block 616) and, based on a determination of the geographic location associated with the first sensor data, determining one or more first actions to take in response to receiving the first sensor data from the geographic location (optional block 618).

Alternatively, analyzing the first sensor data to determine one or more first actions to take in response to receiving the first sensor data from the one or more user devices (at block 612) might comprise analyzing, with the computing system, the first sensor data to determine whether the first sensor data comprises jerk feedback associated with a particular geographic location (optional block 620). At optional block 622, method 600 might comprise, based on a determination that the first sensor data comprises jerk feedback associated with the particular geographic location, determining one or more second actions to be taken in response to receiving the jerk feedback from the at least one first user device. Next, at optional block 624, method 600 might include generating a notification indicating a geographic location where the jerk feedback occurred. Method 600, at optional block 626, might also include sending, with the computing device, the notification to one or more user devices located within the geographic location where the jerk feedback occurred.

According to some embodiments, implementing the one or more first actions based at least in part on the analysis of the first sensor data (at block 614) might comprise identifying, with the computing system, at least one user to receive the first sensor data (optional block 628) and sending, with the computing system, the first sensor data to one or more second user devices associated with the at least one user identified by the computing system (optional block 630).

Alternatively, or additionally, implementing the one or more first actions based at least in part on the analysis of the first sensor data (at block 614) might comprise determining, with the computing device, whether the first sensor data from the one or more first user devices is related to second sensor data from one or more second user devices (optional block 632). Method 600, at optional block 634, might comprise, based on a determination that the first sensor data from the one or more first user devices is related to the second sensor data from the one or more second user devices, associating, with the computing system, the first sensor data from the one or more first user devices with the second sensor data from the one or more second user devices. The first sensor data may be associated with the second sensor data based on a common geographic location associated with the first sensor data and the second sensor data, a common time associated with the first sensor data and the second sensor data, and/or the like.

Additionally and/or alternatively, method 600 might comprise generating, with the computing system, a profile with the first sensor data and the second sensor data (optional block 636) and might comprise displaying, with the computing system, the profile with the first sensor data and the second sensor data on one or more second user devices (optional block 638). The profile may display, without limitation, at least one of vehicle traffic in one or more geographic locations, pedestrian traffic in one or more geographic locations, one or more obstacles located in one or more geographic locations, natural disasters in one or more geographic locations, or one or more weather paths, and/or the like.

Alternatively, or additionally, implementing the one or more first actions based at least in part on the analysis of the first sensor data (at block 614) might comprise determining, with the computing system, a time sensitivity associated with the first sensor data (optional block 640), based on a determination that the first sensor data is time sensitive, determining, with the computing system, a first amount of time to store the first sensor data (optional block 642), and based on a determination that the first sensor data is not time sensitive, determining, with the computing system, a second amount of time to store the first sensor data (optional block 644).

Exemplary System and Hardware Implementation

Figure 7:
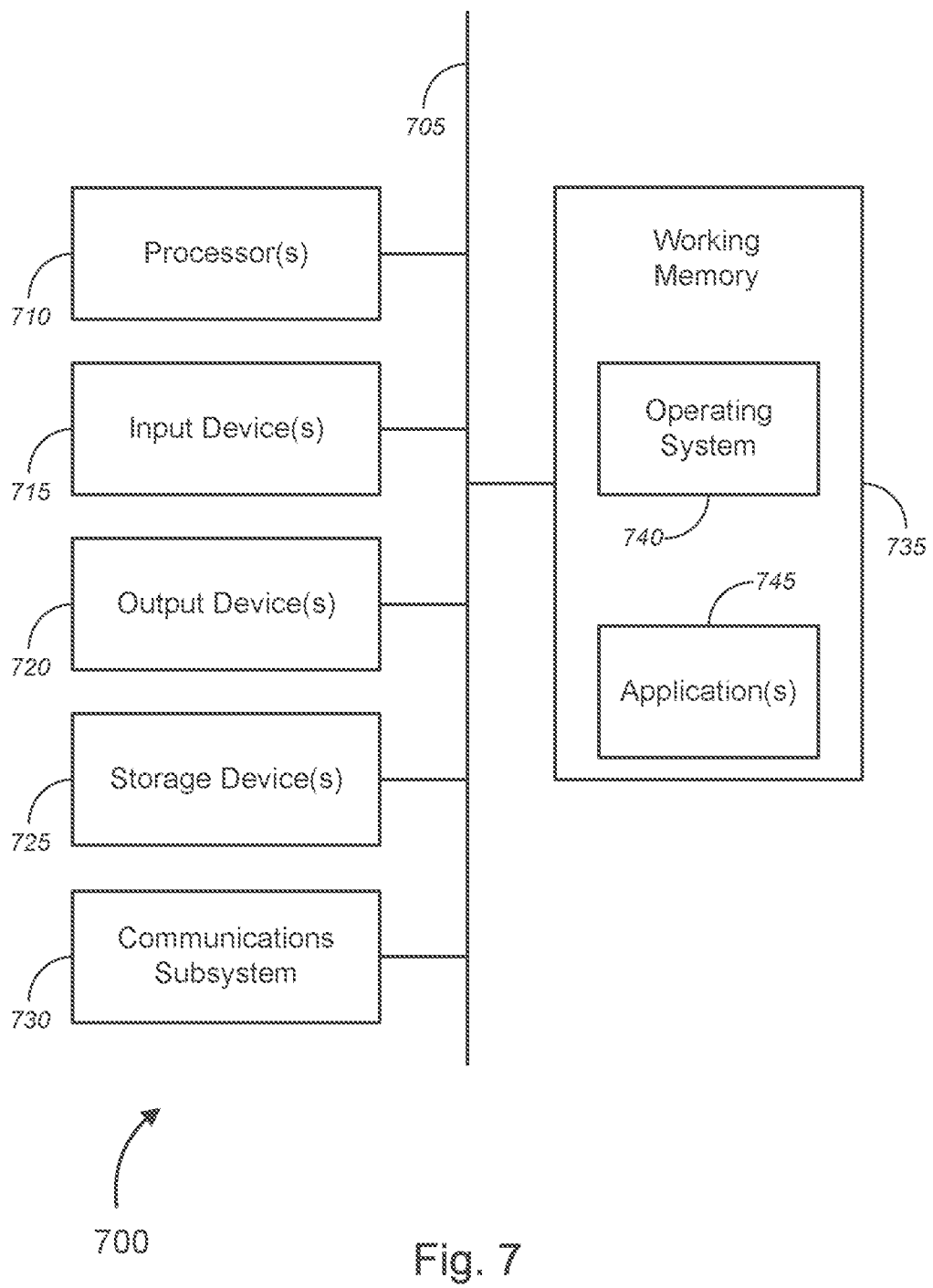
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., telemetry hubs 105, 305, 405, and 505, computing systems 115 and 315, user devices 125a-125n, 325a-325n, and 415, client devices 135a-135n, 335a-335n, blockchain systems 150, or blockchain computing system 155, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., telemetry hubs 105, 305, 405, and 505, computing systems 115 and 315, user devices 125a-125n, 325a-325n, and 415, client devices 135a-135n, 335a-335n, blockchain systems 150, or blockchain computing system 155, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
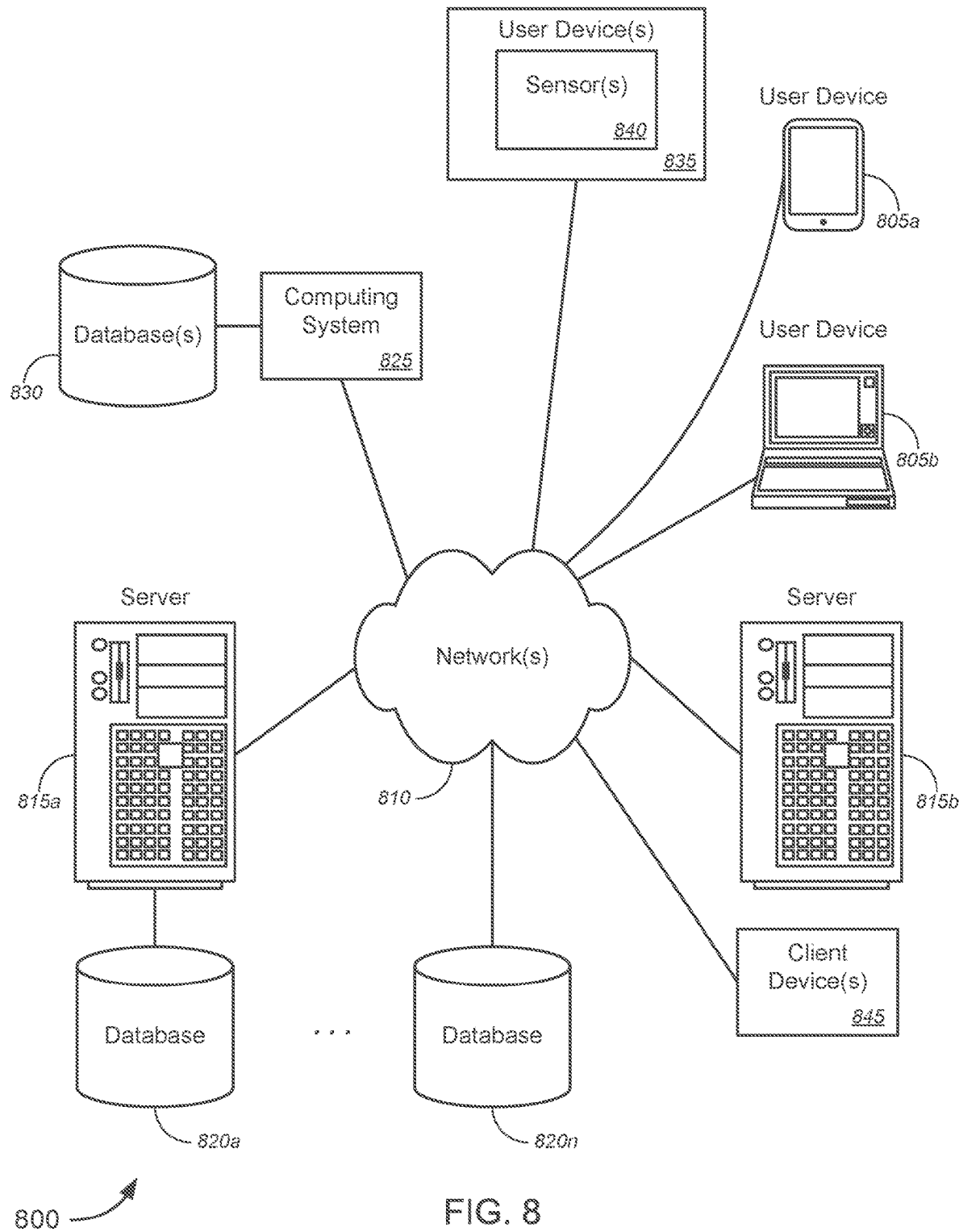
FIG. 8 is a block diagram illustrating a networked system of computers, computing systems, or system hardware architecture, which can be used in accordance with various embodiments.

As noted above, a set of embodiments comprises methods and systems for implementing a telemetry hub, and, more particularly, to methods, systems, and apparatuses for implementing a telemetry hub that obtains sensor data from a plurality of sources and that determines one or more first actions to take in response to receiving the first sensor data from the plurality of sources. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 140, 160, 340 of FIGS. 1 and 3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol (e.g., LTE protocol, 5G protocol, LoRa protocol, etc.); and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing a telemetry hub, and, more particularly, to methods, systems, and apparatuses for implementing a telemetry hub that obtains sensor data from a plurality of sources and that determines one or more first actions to take in response to receiving the first sensor data from the plurality of sources, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a computing system 825 and corresponding database(s) 830 (similar to telemetry hub 105 and corresponding database 110, computing system(s) 115 and corresponding database(s) 120, telemetry hub 405, and/or telemetry hub 505, of FIGS. 1, 3, 4, and 5, or the like). System 800 might further comprise one or more user devices 835 (similar to user devices 130a-130n, 330a-330n, and 420 of FIGS. 1, 3, and 4, or the like) comprising one or more sensors 840 (similar to sensors 125a-125n, 325a-325n, and 415 of FIGS. 1, 3, and 4, or the like). System 800 might also include one or more client devices 845 (similar to client devices 135a-135n and 335a-335n of FIGS. 1 and 3, or the like).

In operation, computing system 825 might receive first sensor data from one or more sensors 840 associated with one or more first user devices 835. Next, the computing system 825 might determine whether the first sensor data can be trusted. Based on a determination that the first sensor data can be trusted, the computing system 825 might validate the first sensor data from the one or more sensors 840. Based on a determination that the first sensor data is valid, the computing system 825 might analyze the first sensor data to determine one or more first actions to take in response to receiving the first sensor data from the one or more user devices 835. Next, the computing system 825 might implement the one or more first actions based at least in part on the analysis of the first sensor data. These one or more actions might include sending the first sensor data to a client device(s) 845.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a telemetry hub, first sensor data from one or more sensors associated with one or more first user devices;
   determining, with a computing system, whether the first sensor data can be trusted;
   based on a determination that the first sensor data can be trusted, validating, with the computing system, the first sensor data from the one or more sensors;
   based on a determination that the first sensor data is valid, analyzing, with the computing system, the first sensor data to determine one or more first actions to take in response to receiving the first sensor data from the one or more user devices;
   implementing, with the computing system, the one or more first actions based at least in part on the analysis of the first sensor data; and
   analyzing, with at least one of the computing system or a blockchain system, the first sensor data by performing source identification on the first sensor data,
   wherein the first sensor data comprises source identification information,
   wherein performing source identification on the first sensor data comprises determining the source identification information contained in the first sensor data can be trusted, and
   wherein analyzing the first sensor data to determine one or more first actions to be taken in response to receiving the first sensor data from the at least one first user device further comprises:
   analyzing, with the computing system, the first sensor data to determine whether the first sensor data comprises jerk feedback associated with a particular geographic location;
   based on a determination that the first sensor data comprises jerk feedback associated with the particular geographic location, determining one or more second actions to be taken in response to receiving the jerk feedback from the at least one first user device;

generating a notification indicating a geographic location where the jerk feedback occurred; and sending, with the computing device, the notification to one or more user devices located within the geographic location where the jerk feedback occurred.

2. The method of claim 1, wherein the telemetry hub comprises the computing system.

3. The method of claim 1, wherein the computing system comprises one of a data collection system, a real-time processing system, an artificial intelligence ("AI") system, a server computer, a cloud-based computing system over a network, or a distributed computing system.

4. The method of claim 1, wherein the one or more first user devices comprises one or more network nodes, one or more service provider devices, one or more laptop computers, one or more desktop computers, one or more tablet computers, one or more television sets, one or more smart televisions, one or more media players, one or more gaming consoles, one or more set-top boxes ("STBs"), one or more digital video recording ("DVR") devices, one or more smart phones, one or more mobile phones, or one or more personal digital assistants.

5. The method of claim 1, wherein the one or more sensors comprise one or more accelerometers, one or more thermometers, one or more air flow sensors, one or more light sensors, one or more wind sensors, one or more weather station sensors, one or more wave sensors, one or more motion detectors, one or more humidity sensors, one or more smoke detectors, one or more gas detection sensors, one or more biometric sensors, one or more health sensors, one or more heartbeat sensors, one or more impact sensors, one or more cameras, or one or more location sensors.

6. The method of claim 1, further comprising:

based on a determination that the first sensor data requires further analysis to determine whether the first sensor data can be trusted, sending, with the computing system and to the blockchain system, a request for identifying a blockchain containing a block containing a copy of the first sensor data that is output by the one or more first user devices.

7. The method of claim 1, wherein analyzing the first sensor data comprises analyzing, with the computing system, the first sensor data in real-time or near-real-time.

8. The method of claim 1, wherein analyzing the first sensor data comprises:

determining, with the computing system, a geographic location associated with the first sensor data; and based on a determination of the geographic location associated with the first sensor data, determining one or more second actions to take in response to receiving the first sensor data from the geographic location.

9. The method of claim 1, wherein the first sensor data comprises at least one of data communicated by third party service provider systems, data communicated by public service systems, or public data, wherein the data communicated by public service systems comprises at least one of data communicated by transportation systems, data communicated by delivery systems, or data communicated by emergency response systems, and wherein the public data comprises at least one of data communicated by weather systems, data communicated by user devices, or data communicated by traffic systems.

10. The method of claim 1, wherein the one or more first actions comprise:

identifying, with the computing system, at least one user to receive the first sensor data; and sending, with the computing system, the first sensor data to one or more second user devices associated with the at least one user identified by the computing system.

11. The method of claim 1, wherein the one or more first actions comprise:

determining, with the computing device, whether the first sensor data from the one or more first user devices is related to second sensor data from one or more second user devices; and based on a determination that the first sensor data from the one or more first user devices is related to the second sensor data from the one or more second user devices, associating, with the computing system, the first sensor data from the one or more first user devices with the second sensor data from the one or more second user devices.

12. The method of claim 11, wherein the first sensor data is associated with the second sensor data based on a common geographic location associated with the first sensor data and the second sensor data.

13. The method of claim 11, further comprising:

generating, with the computing system, a profile with the first sensor data and the second sensor data; and displaying, with the computing system, the profile with the first sensor data and the second sensor data on one or more third user devices.

14. The method of claim 13, wherein the profile displays at least one of vehicle traffic in one or more geographic locations, pedestrian traffic in one or more geographic locations, one or more obstacles located in one or more geographic locations, natural disasters in one or more geographic locations, or one or more weather paths.

15. The method of claim 1, wherein the one or more first actions comprise:

determining, with the computing system, a time sensitivity associated with the first sensor data;

based on a determination that the first sensor data is time sensitive, determining, with the computing system, a first amount of time to store the first sensor data; and based on a determination that the first sensor data is not time sensitive, determining, with the computing system, a second amount of time to store the first sensor data.

16. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

receive first sensor data from one or more sensors associated with one or more first user devices;

determine whether the first sensor data can be trusted;

based on a determination that the first sensor data can be trusted, validate the first sensor data from the one or more sensors;

based on a determination that the first sensor data is valid, analyze the first sensor data to determine one or more first actions to take in response to receiving the first sensor data from the one or more user devices;

implement the one or more first actions based at least in part on the analysis of the first sensor data; and analyze the first sensor data by performing source identification on the first sensor data, wherein the first sensor data comprises source identification information,
wherein performing source identification on the first sensor data comprises determining the source identification information contained in the first sensor data can be trusted, and
wherein analyzing the first sensor data to determine one or more first actions to be taken in response to receiving the first sensor data from the at least one first user device further comprises:
analyzing the first sensor data to determine whether the first sensor data comprises jerk feedback associated with a particular geographic location;
based on a determination that the first sensor data comprises jerk feedback associated with the particular geographic location, determining one or more second actions to be taken in response to receiving the jerk feedback from the at least one first user device;
generating a notification indicating a geographic location where the jerk feedback occurred; and
sending the notification to one or more user devices located within the geographic location where the jerk feedback occurred.

17. A system, comprising:
a first user device comprising:
at least one first processor; and
a first non-transitory computer readable medium communicatively coupled to the at least one first processor, the first non-transitory computer readable medium having stored thereon computer software comprising a first set of instructions that, when executed by the at least one processor, causes the first user device to:
receive sensor data from one or more sensors associated with the first user device; and
send the sensor data to a telemetry hub;
the telemetry hub comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the telemetry hub to:
receive the first sensor data from the first user device; and
send the first sensor data to a computing system;
the computing system comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the computing system to:
determine whether the first sensor data can be trusted;
based on a determination that the first sensor data can be trusted, validate the first sensor data from the one or more sensors;
based on a determination that the first sensor data is valid, analyze the first sensor data to determine one or more first actions to take in response to receiving the first sensor data from the one or more user devices;
implement the one or more first actions based at least in part on the analysis of the first sensor data; and
analyze the first sensor data by performing source identification on the first sensor data,
wherein the first sensor data comprises source identification information,
wherein performing source identification on the first sensor data comprises determining the source identification information contained in the first sensor data can be trusted, and
wherein analyzing the first sensor data to determine one or more first actions to be taken in response to receiving the first sensor data from the at least one first user device further comprises:
analyzing, with the computing system, the first sensor data to determine whether the first sensor data comprises jerk feedback associated with a particular geographic location;
based on a determination that the first sensor data comprises jerk feedback associated with the particular geographic location, determining one or more second actions to be taken in response to receiving the jerk feedback from the at least one first user device;
generating a notification indicating a geographic location where the jerk feedback occurred; and
sending, with the computing device, the notification to one or more user devices located within the geographic location where the jerk feedback occurred.

\* \* \* \* \*